United States Patent
Romaniuk et al.

(10) Patent No.: US 12,209,041 B2
(45) Date of Patent: *Jan. 28, 2025

(54) REDUCING UNDESIRABLE EMISSIONS FROM SEDIMENTS VIA TREATMENT WITH LIME

(71) Applicant: Graymont Western Canada Inc., Richmond (CA)

(72) Inventors: Nikolas Andrei Romaniuk, Edmonton (CA); Michael John Tate, Oregon, OH (US); Narain Hariharan, South Jordan, UT (US)

(73) Assignee: GRAYMONT WESTERN CANADA INC., Richmond (CA)

( * ) Notice: Subject to any disclaimer, the term of this patent is extended or adjusted under 35 U.S.C. 154(b) by 395 days.

This patent is subject to a terminal disclaimer.

(21) Appl. No.: 17/861,058

(22) Filed: Jul. 8, 2022

(65) Prior Publication Data
US 2022/0411305 A1   Dec. 29, 2022

Related U.S. Application Data

(63) Continuation of application No. 17/308,365, filed on May 5, 2021, now Pat. No. 11,414,335.
(Continued)

(51) Int. Cl.
*C02F 11/145* (2019.01)
*B09C 1/08* (2006.01)
(Continued)

(52) U.S. Cl.
CPC .............. *C02F 11/145* (2019.01); *B09C 1/08* (2013.01); *C02F 1/5236* (2013.01); *C02F 1/66* (2013.01);
(Continued)

(58) Field of Classification Search
None
See application file for complete search history.

(56) References Cited

U.S. PATENT DOCUMENTS

| 11,414,335 B2 * | 8/2022 | Romaniuk ............ C02F 1/5236 |
| 2009/0202410 A1 | 8/2009 | Kawatra et al. |

(Continued)

FOREIGN PATENT DOCUMENTS

CN   104446329 A   3/2015

OTHER PUBLICATIONS

International Preliminary Report on Patentability mailed on Nov. 17, 2022 for International Application No. PCT/CN2021/030803, filed on May 5, 2021 (5 pages).
(Continued)

*Primary Examiner* — Clare M Perrin
(74) *Attorney, Agent, or Firm* — Perkins Coie LLP; Vijay S. Kumar

(57) ABSTRACT

Methods and systems for reducing greenhouse gas emissions from sediments containing organic materials via treatment with lime are disclosed herein. In some embodiments, the method comprises (i) providing sediments comprising a first pH less than 10.0, fermentable organic materials, and microbes configured to produce carbon dioxide and/or methane via degradation of the organic material; (ii) adding a coagulant comprising lime to the sediment to produce a mixture comprising a second pH of at least 11.0 and excess soluble calcium ions; and (iii) after adding the coagulant, forming a buffer comprising soluble sodium and calcium bicarbonates within the mixture by enabling the excess soluble sodium and calcium ions to react with carbon dioxide. Forming the buffer can comprise decreasing the pH of the mixture from the second pH to a third pH of 8.0 or greater.

20 Claims, 10 Drawing Sheets

Related U.S. Application Data

(60) Provisional application No. 63/020,446, filed on May 5, 2020.

(51) Int. Cl.
| | | |
|---|---|---|
| *C02F 1/52* | (2023.01) | |
| *C02F 1/66* | (2023.01) | |
| *C10G 1/04* | (2006.01) | |
| *B01D 21/01* | (2006.01) | |
| *C02F 103/10* | (2006.01) | |

(52) U.S. Cl.
CPC .............. *C10G 1/045* (2013.01); *B01D 21/01* (2013.01); *C02F 2103/10* (2013.01); *C02F 2209/06* (2013.01); *C02F 2303/04* (2013.01)

(56) References Cited

U.S. PATENT DOCUMENTS

| | | |
|---|---|---|
| 2019/0055149 A1 | 2/2019 | Tate et al. |
| 2019/0135663 A1 | 5/2019 | Tate et al. |

OTHER PUBLICATIONS

International Search Report and Written Opinion mailed on Aug. 23, 2021 for International Application No. PCT/CN2021/030803, filed on May 5, 2021(8 pages).

Zawar, Prachi et al. "CO2 capture using limestone for cultivation of the freshwater microalga chlorella sorokiniana PAZ and the *Cyanobacterium arthrospira* sp. VSJ", Bloresource Technology, 2016, vol. 221, pp. 498-509.

\* cited by examiner

REDUCING UNDESIRABLE EMISSIONS FROM SEDIMENTS VIA TREATMENT WITH LIME

CROSS-REFERENCE TO RELATED APPLICATION(S)

The present application is a Continuation of U.S. patent application Ser. No. 17/308,365, filed May 5, 2021, which claims the benefit of and priority to U.S. Provisional Patent Application 63/020,446, filed May 5, 2020, the disclosure of which is incorporated herein by reference in its entirety. The present application also incorporates herein by reference each of the following applications in their entireties: U.S. patent application Ser. No. 15/922,179, now U.S. Pat. No. 10,369,518, issued Aug. 6, 2019; U.S. patent application Ser. No. 15/681,282, now U.S. Pat. No. 10,647,606, issued on May 12, 2020; U.S. patent application Ser. No. 16/184,689, now U.S. Patent Application Publication 2019/0135663, filed on Nov. 8, 2018; and U.S. patent application Ser. No. 15/566,578, now U.S. Pat. No. 10,558,962, issued on Feb. 11, 2020.

TECHNICAL FIELD

The present application relates to reducing undesirable emissions from sediments and residual materials, including mine tailings, via treatment with lime.

BACKGROUND

Organic materials are often found distributed in sediments or residual industrial materials, such as mine tailings, and can be transformed by microbes through various processes including aerobic fermentation and degradation or anaerobic methanogenesis. The transformation of carbon through these processes produces greenhouse gases (e.g., carbon dioxide and methane). Anthropogenic disruptions of aquatic environments can increase the quantity of organics in sediments. The potential release of GHGs from the large quantities of negatively affected sediments and residual industrial material by the biological processes is a serious concern that contributes to climate change. As such, there is a need for improved systems and methods to treat sediment deposits in a manner that reduces undesirable emissions therefrom.

SUMMARY

Embodiments of the present technology relate to reducing the release of undesirable emissions such as greenhouse gases (GHG) from sediments (e.g., tailings) by treating the sediments with lime. The present technology is illustrated, for example, according to various aspects described below, including with reference to FIGS. 1-10. Various examples of aspects of the subject technology are described as numbered clauses (1, 2, 3, etc.) for convenience. These are provided as examples and do not limit the subject technology.

1. A method for reducing undesirable emissions from sediments, the method comprising:
   providing sediments comprising a first pH less than 10.0, organic materials, and microbes;
   producing carbon dioxide via aerobic degradation of the organic materials via the microbes; and
   adding a coagulant comprising lime to the sediments to produce a lime-treated sediments mixture comprising a second pH of at least 11.0.

2. The method of any one of the clauses herein, further comprising sequestering the produced carbon dioxide as a stable mineral.

3. The method of any one of the clauses herein, wherein the sediments mixture comprises soluble calcium ions, the method further comprising producing calcium carbonate by enabling the soluble calcium ions to react with the carbon dioxide produced via aerobic degradation.

4. The method of any one of the clauses herein, further comprising forming calcium carbonate from the produced carbon dioxide.

5. The method of any one of the clauses herein, wherein:
   the sediments mixture comprises fermented organic material,
   the microbes are able to produce an undesirable gas via anaerobic degradation of the organic material, and
   adding the coagulant comprising lime to the sediments mixture decreases the amount of the microbes and/or inhibits production of the undesirable gas via the microbes.

6. The method of any one of the clauses herein, wherein:
   the sediments mixture comprises fermented organic material,
   the microbes are able to produce an undesirable gas via anaerobic degradation of the organic material, and
   the second pH of the sediments mixture decreases the amount of the microbes and/or inhibits production of the undesirable gas via the microbes.

7. The method of any one of the clauses herein, wherein:
   the sediments at the first pH comprise a first amount of microbes able to produce an undesirable gas via anaerobic degradation of the organic material, and
   the sediments mixture at the second pH has a second amount of microbes less than the first amount.

8. The method of any one of the clauses herein, further comprising:
   measuring a first amount of microbes in the sediments, the microbes being able to produce an undesirable gas via anaerobic degradation of the organic material, and
   measuring a second amount of microbes in the sediments mixture, the second amount being less than the first amount.

9. The method of clause 8, wherein the second amount of microbes is at least one order of magnitude, two orders of magnitude, or three orders of magnitude less than the first amount of microbes.

10. The method of clause 8, wherein the second amount of microbes is less than 630,000 microbes per microliter of dewatered tailings 90 days after adding the lime-based coagulant.

11. The method of any one of the clauses herein, wherein the carbon dioxide is a fermented material.

12. The method of any one of the clauses herein, where the sediments mixture comprises fermented materials including (i) citric acid or its derivatives, (ii) acetic acid or its derivatives, or (iii) citric acid, acetic acid, and their derivatives.

13. The method of any one of the clauses herein, wherein the sediments mixture comprises excess soluble calcium ions, the method further comprising producing calcium carbonate via reactions between the soluble calcium ions and carbon dioxide from the atmosphere.

14. The method of any one of the clauses herein, wherein pore water of the sediments mixture comprises sodium bicarbonate that is modified by soluble calcium ions of the sediments mixture, and wherein producing the carbon dioxide comprises reacting the sodium bicarbonate and soluble calcium to lower the pH of the sediments mixture from the second pH.

15. The method of any one of the clauses herein, further comprising directing the sediments mixture to a holding area.

16. The method of any one of the clauses herein, further comprising:
   directing the sediments mixture to a holding area or pond; and
   forming a buffer layer comprising calcium carbonate at an outer surface of the sediments mixture by reacting excess calcium ions of the sediments mixture with the carbon dioxide produced via aerobic degradation.

17. The method of any one of the clauses herein, wherein the sediments mixture does not include microbes able to produce methane via anaerobic degradation of the organic material present in the sediments mixture.

18. The method of any one of the clauses herein, further comprising dewatering the sediments mixture by centrifugation or filtration.

19. The method of clause 18, wherein dewatering results in solids content of the dewatered tailings achieving at least 50%, 60%, 70%, or 80% by mass of solids.

20. The method of clause 18, wherein dewatering results in a partially desaturated or desaturated product.

21. The method of clause 18, wherein dewatering comprises pressure filtrating the sediments mixture to produce a cake, the cake being in an aerobic state such that the microbes are inhibited from producing an undesirable gas.

22. The method of any one of the clauses herein, further comprising disposing the dewatered sediments mixture over other sediments stored in a holding area or pond.

23. The method of any one of the clauses herein, further comprising flocculating the sediments mixture by adding a polymer in-line.

24. The method of any one of the clauses herein, wherein the second pH is at least 12.0 or 12.5.

25. The method of any one of the clauses herein, wherein the sediments originate from mining operations.

26. The method of any one of the clauses herein, wherein the sediments originate from oil sands operations.

27. The method of any one of the clauses herein, wherein the sediments comprise tailings.

28. The method of any one of the clauses herein, wherein the sediments comprise clay, bicarbonates, and/or a solids content of at least 10% by weight.

29. The method of any one of the clauses herein, wherein the sediments mixture is substantially free of bicarbonates.

30. The method of any one of the clauses herein, wherein adding the coagulant comprises adding a lime dosage of at least 1,000 ppm, 1,500 ppm, 2,000 ppm, 2,500 ppm, 3,000 ppm, 3,500 ppm, 4,000 ppm, 4,500 ppm, or 5,000 ppm on a wet weight basis.

31. A method for reducing undesirable emissions from sediments, the method comprising:
   providing sediments in an anaerobic state, the sediments comprising a pH of no more than 10.0, fermented material, and microbes able to produce an undesirable gas via anaerobic degradation of the fermented material; and
   treating the sediments such that the sediments are contained in an aerobic state, wherein treating the sediments comprises
      adding a coagulant comprising lime to the sediments to produce a sediments mixture having a pH of at least 11.0, and
      dewatering the sediments mixture to produce an at least partially dewatered sediments mixture.

32. The method of any one of the clauses herein, wherein, when in the aerobic condition, the microbes are inhibited from producing the undesirable gas.

33. The method of any one of the clauses herein, wherein the sediments mixture comprises fermentable or biodegradable organic materials and microbes able to produce carbon dioxide via aerobic degradation of the organic material.

34. The method of clause 33, further comprising producing carbon dioxide via the aerobic microbial degradation.

35. The method of clause 34, further comprising producing a stable mineral via the produced carbon dioxide.

36. The method of clause 35, wherein the sediments mixture comprises soluble calcium ions, the method further comprising producing calcium carbonate via the soluble calcium ions and the carbon dioxide produced via aerobic degradation.

37. The method of clause 35, wherein the sediments mixture comprises soluble calcium ions, the method further comprising enabling the soluble calcium ions to react with the carbon dioxide produced via aerobic degradation to produce calcium carbonate.

38. The method of clause 35, wherein the sediments mixture comprises soluble calcium ions, the method further comprising sequestering atmospheric carbon dioxide by reacting the atmospheric carbon dioxide with the soluble calcium ions to form soluble bicarbonates.

39. The method of any one of the clauses herein, wherein adding the coagulant to the sediments mixture decreases the amount of the microbes and/or inhibits production of the undesirable gas via the microbes.

40. The method of any one of the clauses herein, wherein the at least partially dewatered sediments mixture exists in an aerobic environment that inhibits production of the undesirable gas via the microbes.

41. The method of any one of the clauses herein, wherein the sediments mixture comprises excess soluble calcium ions, the method further comprising producing calcium carbonate via the soluble calcium ions and carbon dioxide from the atmosphere.

42. The method of any one of the clauses herein, wherein the sediments mixture comprises sodium bicarbonate and excess calcium ions, the method further comprising sequestering carbon dioxide produced via reactions between the sodium bicarbonate and excess 43. The method of any one of the clauses herein, wherein dewatering comprises removing enough water from the sediments mixture to produce a cake, the cake being in an aerobic state such that the microbes are inhibited from producing the undesirable gas.

44. The method of any one of the clauses herein, wherein dewatering the lime-tailings mixture comprises a partially or fully desaturated cake, the cake being in an aerobic state such that the microbes are inhibited from producing the undesirable gas.

45. The method of any one of the clauses herein, wherein the undesirable gas comprises a greenhouse gas.

46. The method of any one of the clauses herein, wherein the undesirable gas comprises methane.

47. The method of any one of the clauses herein, wherein the undesirable gas comprises carbon dioxide.

48. The method of any one of the clauses herein, wherein the sediment comprises tailings originating from oil sands or mining operations.

49. The method of any one of the clauses herein, wherein the microbes of the sediments mixture are less reactive or more dormant than the microbes of the sediments.

50. The method of any one of the clauses herein, wherein the microbes of the sediments have a first level of reactivity and the microbes of the sediments mixture have a second level of reactivity less than the first level of reactivity.

51. The method of any one of the clauses herein, wherein the microbes of the sediments are able to produce a first amount of methane via degradation of the fermented material, and the microbes of the sediments mixture are able to produce a second amount of methane via degradation of the fermented material, the second amount of methane being less than the first amount of methane.

52. The method of clause 51, wherein the partially dewatered sediments mixture includes a third amount of microbes, and wherein the microbes of the partially dewatered sediments mixture are less reactive or more dormant than the microbes of the sediments.

BRIEF DESCRIPTION OF THE DRAWINGS

Many aspects of the present technology can be better understood with reference to the following drawings. The components in the drawings are not necessarily to scale. Instead, emphasis is placed on illustrating the principles of the present technology clearly. A person skilled in the relevant art will understand that the features shown in the drawings are for purposes of illustrations, and variations, including different and/or additional features and arrangements thereof, are possible.

DETAILED DESCRIPTION

I. Overview

Figure 1:
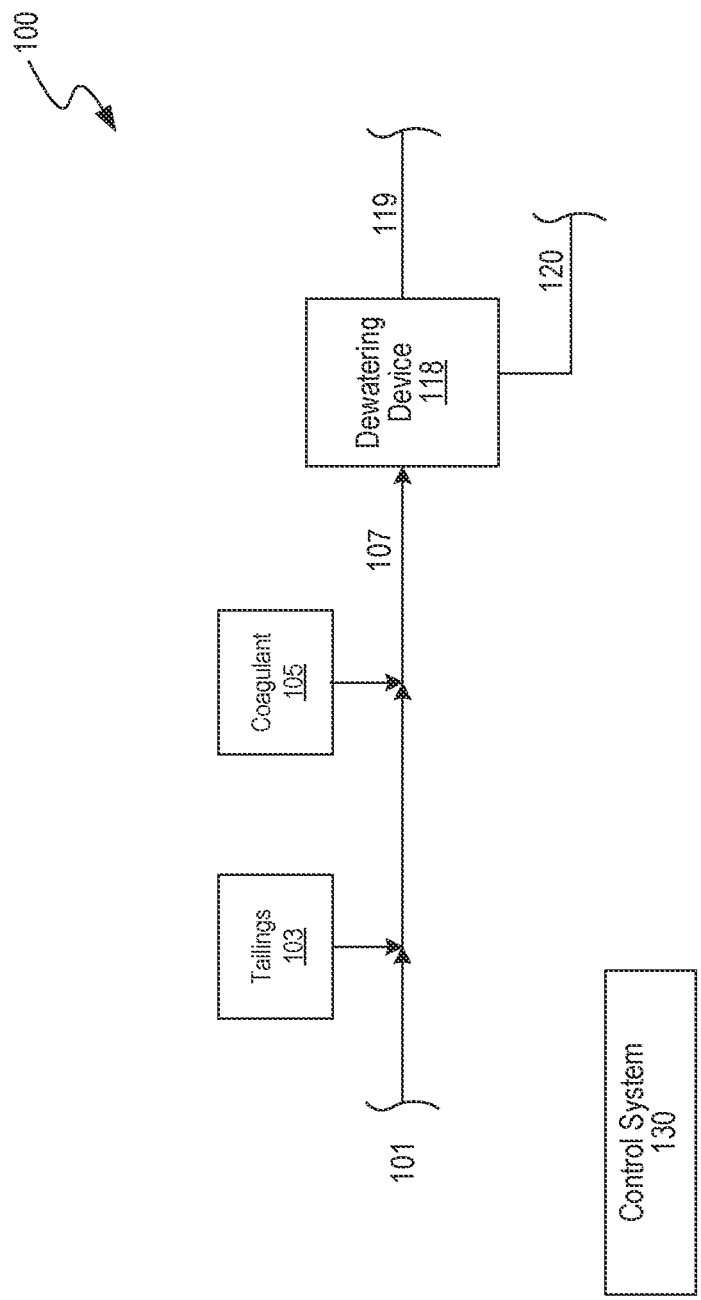
FIG. 1 is a schematic block diagram of a lime-treated system, in accordance with embodiments of the present technology.

Industrial residual materials, such as mine tailings, have limited beneficial uses, and in some cases must be stored at the processing operation. Some of these materials are produced as slurries which are stored in ponds or could be dewatered to form dry, stackable deposits. The composition of these residual materials varies with the application but can contain organic materials. Over time, degradation of fermentable or biodegradable organic materials via microbes (e.g., bacteria, archaea, or other microbiological means), can produce greenhouse gases (GHG) such as carbon dioxide and methane that are subsequently released into the atmosphere. For example, organic materials (e.g., organic process additives, naturally occurring organic contaminants, diluents, and organic polymer treatments of the tailings) present in untreated tailings can undergo microbial degradation and thereby cause carbon dioxide and biomass methane to be produced and emitted from the tailings ponds or holding areas. Given current estimates that over a billion cubic meters of worldwide tailings are present in such ponds or holding areas, the corresponding GHG emissions from treated tailings can be significant.

Sediments from aquatic systems (e.g. lakes, ponds, estuaries) can be negatively affected by human activity (e.g. climate change, introduction of alien species) which causes increased growth of noxious plants and algae biomass, such as toxic algal blooms. When this biomass dies it can decay in the sediment where the organic matter will be converted to carbon dioxide and biomass methane. The potential GHG emissions due to decomposing organic matter resulting from human interference is expected to be elevated compared to baseline aquatic ecosystems resulting in a significant source of greenhouse gas emissions.

The chemical reactions necessary for microbial degradation of organic materials in sediments and tailings are dependent on the pH of the sediment or tailings process and pore water. The acceptable pH range for the anaerobic digestion reactions which produce both carbon dioxide and methane is between 6.0 and 8.5 pH, and the optimal pH range for these processes is 6.8 to 7.2. The acceptable pH range for aerobic digestion which produces carbon dioxide is dependent on the aerobic bacteria but is generally 5.0 to 8.0 pH, and the optimal pH for aerobic digestion is 7.0. In some embodiments, the Generally aerobic digestion removes oxygen first from the sediments and tailings, and converts organics into fermentation products such as carbon dioxide, acetic acid, and citrate. With the oxygen removed, anaerobic digestion can continue to reduce the carbon in fermentation products, such as carbon dioxide, into methane gas. Suitable microbes must be present for each form of digestion to occur.

Embodiments of the present technology can reduce the emissions of GHG from these residual materials or sediments (e.g., tailings) via treatment with lime at elevated pH levels. As explained in detail herein, by treating the sediments with lime to reach elevated pH levels (e.g., at 11.0, 12.0, or higher), embodiments of the present technology can decrease the amount of GHG produced (and emitted) from sediments by (i) inhibiting the reactivity of the microbes responsible for producing the GHG from anaerobically degrading the organic material of the sediments, and/or (ii) decreasing the amount of carbon dioxide, produced via aerobic degradation of the organic material, that is released from the sediments, and (iii) decreasing the amount of the microbes present in the sediments. In doing so, the amount of biomass methane able to be produced from the microbes is decreased. As explained in additional detail herein, a method for reducing undesirable emissions from sediments can comprise adding a coagulant comprising lime to the sediments to produce a sediments mixture comprising a pH of at least 11.0. Lime products useful for these treatments can include quicklime, hydrated lime, lime slurry or lime kiln dust products. Without being bound by theory, the sediments mixture at a pH of at least 11.0 is above the optimal pH ranges for aerobic and anaerobic digestion and as a result reduce the amount of microbes present in the mixture, and/or can inhibit the growth of microbes therein. Additionally or alternatively, enhanced dewatering of the sediments mixture to a partially or fully desaturated state can further reduce the amount of anaerobic microbes present in the mixture and/or inhibit the growth of these microbes, e.g., by creating an aerobic environment in which the microbes are unable to degrade the organic material of the tailings to produce methane or other undesirable gases.

In some embodiments, the method for reducing undesirable GHG emissions from sediments can further comprise producing carbon dioxide (e.g., biomass carbon dioxide) via biodegradation of a portion of the materials. In some embodiments, such biodegradation may be aerobic degradation via microbes of fermentable or biodegradable organic material in the sediments. In such embodiments, the method may further comprise forming a buffer including calcium carbonate from the produced carbon dioxide, e.g., by reacting the produced carbon dioxide with excess soluble calcium ions contained in the pore water of the sediments mixture. Additionally or alternatively, calcium carbonate and/or bicarbonates may be formed by reacting the excess soluble calcium ions in the water of sediments with carbon dioxide present in the atmosphere or from industrial emissions. In doing so, embodiments of the present technology can directly capture and sequester carbon dioxide from the atmosphere, industrial emissions and/or that produced via aerobic degradation, to form a stable mineral that can be used for other industrial applications. Lime slurry also preferentially reacts with bicarbonates initially present in the water of the sediments mixture to sequester the carbon dioxide that the bicarbonates contain. At a pH of around 11.5, these bicarbonates are substantially depleted, resulting in the formation of soluble calcium and sodium hydroxide. The formation of insoluble calcium carbonates as these hydroxides react with carbon dioxide from the atmosphere or industrial emissions lowers the pH over time. As the pH returns to below 11.5, 11.0, 10.5, 10.0, 9.5, or 9.0, the hydroxide groups can readily react with carbon dioxide to produce bicarbonates and therein return to their bicarbonate form. The reformation of calcium and sodium bicarbonates lowers the pore water pH and can establish a buffer system. The buffer system can provide pH stability to prevent or inhibit the pH from decreasing further, from the elevated pH around 11.5 back to optimal pH levels for methanogensis and/or fermentation of organic materials. Stated differently, the buffer system formed by reaction with carbon dioxide can maintain the lime-treated mixture in a state wherein undesirable emissions of GHG are prevented, inhibited, or minimized.

In addition to reducing GHG emissions, embodiments of the present technology can also treat sediments to produce a dewatered product with improved geotechnical and/or strength characteristics relative to conventional systems and methods for treating tailings. For example, as described with reference to U.S. Pat. No. 10,558,962 (incorporated by reference herein), the dewatered tailings can include thickened or stackable tailings having an undrained shear strength that increases over a period of time of at least two days or longer. Additionally or alternatively, the dewatered tailings can include other characteristics that improve over the period of time, such as plasticity index (i.e., decreases over time), plastic limit (i.e., increases over time), and particle size (i.e., increases over time), amongst other characteristics. Anaerobic reactions (e.g., methanogenesis) are greatly reduced by the partially of fully desaturated state found in stackable tailings.

In the figures, identical reference numbers identify generally similar and/or identical elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Systems and Method for Reducing Undesirable Emissions from Sediment Mixtures Via Treatment with Lime FIG. 1 is a schematic block diagram of a lime-treated system 100 ("system 100"), in accordance with embodiments of the present technology. As shown in the illustrated embodiment, the system 100 includes sediment and/or tailings 103 ("tailings 103"), and a coagulant 105 to be combined with the tailings 103. The tailings 103 and coagulant 105 may be combined and/or mixed in-line (as shown in FIG. 1) or via a mixer. The dosage of coagulant 105 combined with the tailings 103 may be at least about 1,000 ppm (e.g., 1000 mg/L), 2,000 ppm, 2,500 ppm, 3,000 ppm, 3,500 ppm, 4,000 ppm, 4,500 ppm, or 5,000 ppm on a wet weight of tailings basis. The combined tailings 103 and coagulant 105 produces a mixture 107. In some embodiments, the dosage of coagulant 105 combined with the tailings 103 may be based on a desired pH of the resulting mixture 107. The mixture 107 is provided to a dewatering device 118 that can separate the mixture 107 into a first stream or solution 119 (e.g., a dewatered tailings, product, or "cake") comprising a solids content of at least 40% by weight, and a second stream or solution 120 comprising release water. The first stream 119 can be provided to a disposal or holding area (e.g., a pond or diked area) and the second stream 120 may be provided as recycle or effluent to another disposal or containment area.

The tailings 103 can be provided from a tailings reservoir (e.g., the tailings reservoir 102 (FIG. 2A), a pond, diked area, tank, etc.), or directly from another process stream 101 (e.g., an extraction process stream, a treatment process stream, etc.) without being routed through the tailings reservoir 102. In some embodiments, the tailings 103 can originate from operations related to the extraction of minerals (e.g., copper, iron ore, gold and/or uranium), e.g., from mining operations. In some embodiments, the tailings 103 can originate from the extraction or treatment of organic materials (e.g. oil sands tailings, refinery residual materials).

The tailings 103 can have a pH less than about 10.0, 9.0, or 8.0 or from about 7.0-10.0, 7.5-9.5, or 8.0-9.0. The composition of the tailings 103 can include water (e.g., process water and/or pore water), sand, bicarbonates (e.g., sodium bicarbonate), sulfates, clay (e.g., kaolinite, illite, etc.), residual organic materials, organic polymers, heavy metals, sulfur, and other impurities that are suspended in the water. In some embodiments, the tailings 103 can include a solids content of from about 5-40% and a fermentable or biodegradable organic material content of from about 0-3%. In some embodiments, the tailings 103 can contain over 3% fermentable or biodegradable organic material. The solids content can have a range of 0-100% clay. The tailings 103 can be obtained or be provided as a batch process (e.g., intermittently provided from tailings ponds) or as a steady-state extraction process (e.g., continuously provided from oil sands or mining operations, or stepwise feeding in pattern). In some embodiments, the tailings 103 may undergo upstream processing prior to the tailings reservoir, e.g., cyclone separation, screen filtering, thickening and/or dilution processes. Additionally or alternatively, the tailings 103 may be diluted to decrease the solids content thereof. In some embodiments, the tailings 103 may be mixed with sand, overburden, and/or other materials to increase its solids content. Additionally or alternatively, the tailings 103 can also include fermentable or biodegradable organic material that, when anaerobically degraded by microbes, can produce one or more greenhouse gases (GHG) (e.g., carbon dioxide or methane) or biomass that can emit GHG. Such microbial degradation may occur when the tailings 103 are stored in stagnant conditions, such as in submerged regions in ponds or holding areas, and may only occur when the microbes and organic material are in an anaerobic state.

The coagulant 105 can include lime and/or inorganic materials that provide divalent cations (e.g., calcium), and may be provided from a coagulant reservoir (e.g., a coagulant reservoir 104 (FIG. 2A), a tank, etc.). The lime can include hydrated lime (e.g., calcium hydroxide ($Ca(OH)_2$)), quicklime (e.g. calcium oxide (CaO) and/or slaked quicklime (e.g., Ca $(OH)_2$). In some embodiments, the hydrated lime can include enhanced hydrated lime (e.g., calcium hydroxide particles having a specific surface area of at least 25 $m^2/g$), as described in U.S. Pat. No. 10,369,518, the disclosure of which is incorporated herein by reference in its entirety. The lime can be part of a slurry such that the lime makes up a portion (e.g., no more than 30%, 25%, 20%, 15%, 10%, 5%, 1%, or 0.1% by weight) of the lime slurry. The remainder of the lime slurry can include water (e.g., release water, makeup water, and/or process water). In some embodiments, the lime or lime slurry can include dolomitic lime (e.g., lime including at least 25% magnesium oxide on a non-volatile basis), or a combination of quicklime, limestone (e.g., calcium carbonate ($CaCO_3$)), hydrated lime, enhanced hydrated lime, dolomitic lime, lime kiln dust, and/or other lime-containing materials. The lime slurry can have a pH of at least 12.0 or from about 12.0-12.5.

As previously described, the tailings 103 and the coagulant 105 can be combined in a mixer (e.g., mixer 106 (FIG. 2A)) to produce the mixture 107. In such embodiments, the mixer can be a static mixer, a dynamic mixer, or a T-mixer, and/or can include rotatable blades or other means to agitate the combined tailings 103 and coagulant 105. The residence time in the mixer for the tailings 103 and coagulant 105 can be, e.g., less than about 30 seconds, 60 seconds, 5 minutes. As previously described, in some embodiments the mixer is omitted and the tailings 103 and coagulant 105 can be mixed in-line, e.g., via turbulent flow conditions. In general, the tailings 103 and coagulant 105 are mixed (e.g., via the mixer or in-line) to ensure the mixture 107 has a substantially uniform composition, and a desired pH and/or soluble calcium level.

The pH of the mixture 107 can be at least about 11.0, 11.1, 11.2, 11.3, 11.4, 11.5, 11.6, 11.7, 11.8, 11.9, 12.0, 12.1, 12.2, 12.3, 12.4 or 12.5. Additionally or alternatively, the soluble calcium level (i.e., the calcium cations in solution) of the mixture 107 is at least about 100 mg/L, 200 mg/L, 300 mg/L, 400 mg/L, 500 mg/L, 600 mg/L, 700 mg/L, or 800 mg/L. A pH above 11.0 can minimize the activity of aerobic and anaerobic microbes, and provide soluble calcium ions, e.g., to sequester carbon dioxide in the process water. As explained in additional detail elsewhere herein (e.g., with reference to FIG. 2A), the soluble calcium level of the mixture 107 is in part dependent on the pH of the mixture and/or the bicarbonates present in the tailings 103, which react with the calcium ions and reduce the free soluble calcium concentration. In some embodiments, a pH of from 11.0 to 12.0 enables ion exchange to occur between the tailings 103 and coagulant 105, and provides soluble calcium ions to sequester carbon dioxide present as bicarbonates in the mixture 107. In practice, the pH of the mixture 107 can be measured, e.g., downstream of where the tailings 103 and coagulant 105 are combined, and used to control the pH and/or soluble calcium level of the mixture 107.

As shown in FIG. 1, the system 100 can further include a control system 130 to control operations associated with the system 100. Many embodiments of the control system 130 and/or technology described below may take the form of computer-executable instructions, including routines executed by a programmable computer. The control system 130 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the term "control system" as generally used herein refers to any data processor. Information handled by the control system 130 can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

Figure 2A:
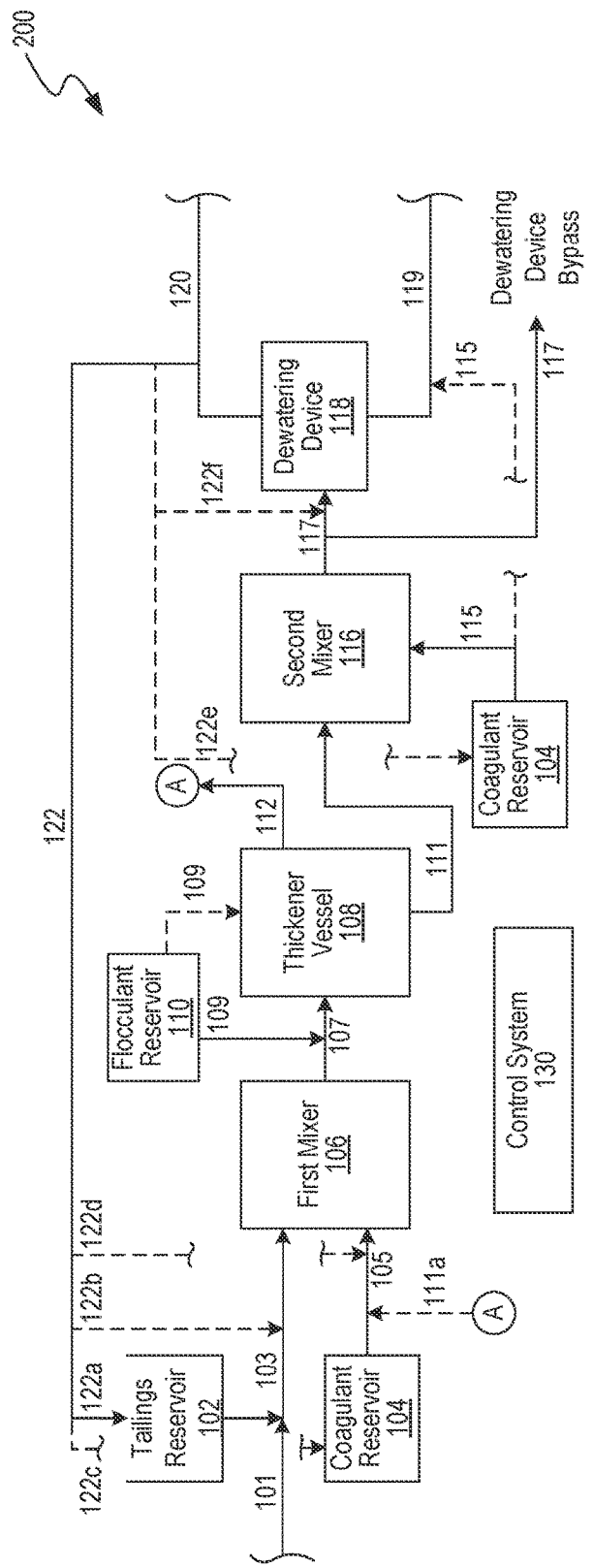
FIGS. 2A and 2B are schematic block diagrams of a lime-treated system, in accordance with embodiments of the present technology.
Figure 2B:
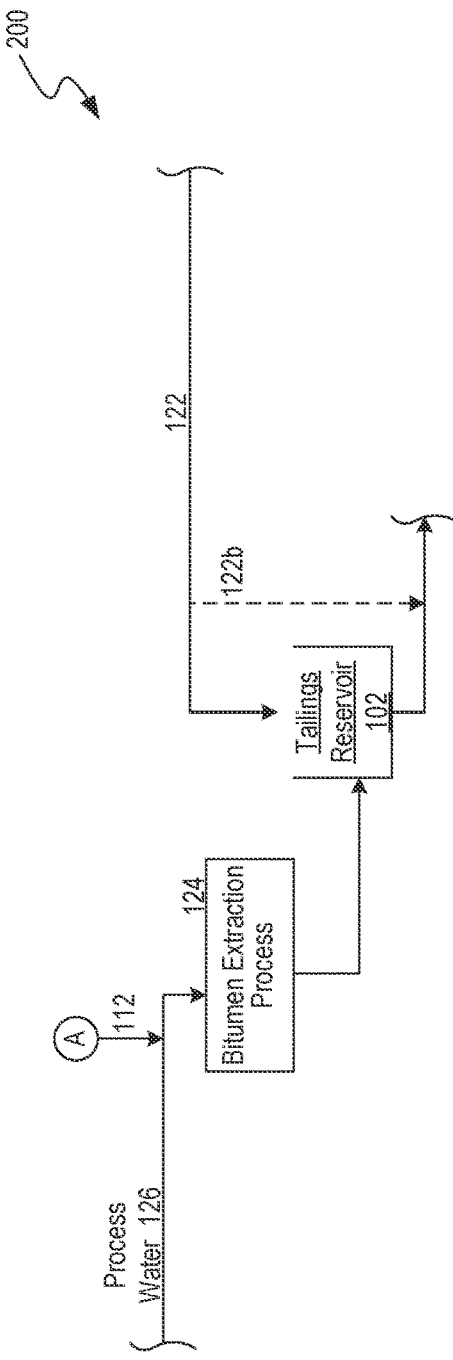

FIGS. 2A and 2B are schematic block diagrams of a lime-treated system ("system 200"), in accordance with embodiments of the present technology. The system 200 includes components and elements similar or identical to those described with reference to FIG. 1. For example, the system 200 includes the previously described tailings 103, coagulant 105 (e.g., first coagulant), and mixture 107 (e.g., first mixture), amongst other features of the system 100.

Combining the first coagulant 105 (e.g., calcium hydroxide) with the tailings 103 (e.g., in the first mixer 106 or in-line) increases the pH of the tailings 103 to be at least about 11.0. At or above a pH of 11.5, carbon dioxide from bicarbonates present in the tailings 103 can be substantially sequestered by reactions with the soluble calcium hydroxide, as described below. In doing so, the soluble calcium ions needed for cation exchange within the first mixture 107 are reduced. Additionally or alternatively, such a pH can also enable the first coagulant 105 to alter the surface charges of the clay of the tailings 103, which promotes dewatering thereof.

Using a coagulant other than calcium hydroxide, such as alum ($Al_2(SO_4)_3$)), gypsum ($CaSO_4 \cdot 2H_2O$) and/or calcium chloride ($CaCl_2$) will not increase the pH of tailings 103 above a pH of 9.0. Moreover, using such other coagulants would facilitate GHG formation by both aerobic and anaerobic degradation of organic materials in the tailings 103. Another disadvantage for using such other coagulants to treat the tailings 103 is that the coagulated tailings would not release water as effectively as those treated with calcium hydroxide would. For example, treating the tailings stream with alum would produce hydrogen ions (e.g., as sulfuric acid) and generally result in a mixture having a pH less than 9.0. A low pH would not enable pozzolanic reactions to occur and thereby would prevent chemical modification of the clay of the tailings 103, e.g., to produce a dewatered tailings with sufficiently high shear strength. Additionally or alternatively, treating the tailings stream with alum, gypsum, calcium chloride, or other coagulants other than calcium hydroxide would not (i) provide increased pH (e.g., a pH of at least about 11.0) to significantly reduce microbial populations and activity, and/or (ii) supply the same amount of soluble calcium ions for sequestering carbon dioxide and improve dewatering of the first mixture 107 to the same degree as calcium hydroxide.

Adding the first coagulant 105 including calcium hydroxide to the tailings 103 can cause or enable Reactions 1-4 below to occur within the first mixture 107.

$$Ca(OH)_{2(aq)} + NaHCO_{3(aq)} \rightarrow CaCO_{3(S)} + NaOH_{(aq)} + H_2O \quad \text{(Reaction 1)}$$

$$NaOH_{(aq)} + NaHCO_{3(aq)} \rightarrow Na_2CO_{3(aq)} + H_2O \quad \text{(Reaction 2)}$$

$$Ca(OH)_{2(aq)} + Na_2CO_{3(aq)} \rightarrow CaCO_{3(S)} + 2NaOH_{(aq)} \quad \text{(Reaction 3)}$$

$$Ca(OH)_{2(aq)} \rightarrow Ca^{2+}_{(aq)} + 2OH^-_{(aq)} \quad \text{(Reaction 4)}$$

Per Reaction 1, when sodium bicarbonate ($NaHCO_3$) of the tailings 103 is exposed to calcium hydroxide ($Ca(OH)_2$), calcium cations ($Ca^{2+}$) bond with carbonate ions ($CO_3^{2-}$) and sodium bicarbonate is converted to insoluble calcium carbonate ($CaCO_3$) (also referred to herein as "calcite"), sodium hydroxide (NaOH) and water ($H_2O$). Per Reaction 2, the produced sodium hydroxide from Reaction 1 reacts with sodium bicarbonate to produce sodium carbonate ($Na_2CO_3$) and water. Per Reaction 3, calcium hydroxide of the first coagulant 105 reacts with the produced sodium carbonate from Reaction 2 to produce calcium carbonate and sodium hydroxide. Per Reaction 4, and as a result of the pH of the first mixture 107 being at or above about 11.0 and the carbonate ions of the mixture 107 being substantially depleted, calcium hydroxide can readily solubilize to form calcium cations and sodium hydroxide.

In practice, Reactions 1 and 3 are limited only by the availability of carbonate ions in the first mixture (i.e., provided by the tailings). As such, Reactions 1 and 3 will reduce the amount of soluble calcium cations available for cation exchange (and pozzolanic reactions) to occur. Stated differently, Reactions 1 and 3 limit the amount of free calcium cations available to react with clays in the first mixture until the carbonate ions are largely depleted and/or removed from the first mixture. As a result of Reactions 1-4, in some embodiments the first mixture may have a soluble calcium level of no more than 100 mg/L, 90 mg/L, 80 mg/L, 70 mg/L, 60 mg/L, 50 mg/L, 40 mg/L, or 30 mg/L on a wet weight of tailings basis.

In some embodiments, the first mixture 107 can be combined with a flocculant 109. The flocculant 109 can include one or more anionic, cationic, nonionic, or amphoteric polymers, or a combination thereof. The polymers can be naturally occurring (e.g., polysaccharides) or synthetic (e.g., polyacrylamides). In some embodiments, the flocculant 109 can be added as a part of a slurry, which may include less than 1% (e.g., about 0.25%) by weight of the flocculant 109, with the substantial remainder being water (e.g., process water, release water, and/or makeup water). In some embodiments, at least one component of the flocculant 109 will have a high molecular weight (e.g., up to about 50,000 kilodaltons). In some embodiments, the flocculant 109 will have a low molecular weight (e.g., below about 10,000 kilodaltons) and/or a medium or high charge density.

As shown in FIG. 2A, the flocculant 109 can be provided from a flocculant reservoir 110 (e.g., a tank or reservoir), and can be combined with the first mixture 107 in-line and/or in a thickener vessel 108 (e.g., a tank or reservoir). The vessel 108 can form, via separation of the first mixture 107, (i) a second mixture 111 including a thickened composition having less water content than that of the first mixture 107, and (ii) process water 112. Without being bound by theory, separation of the first mixture 107 into the second mixture 111 and the process water 112 is promoted at least in part by the pH of the first mixture 107 being at least 11.5 and/or the coagulant 105 including calcium hydroxide which alters the surface charges of the clay of the tailings 103 to promote dewatering. In some embodiments, addition of the flocculant 109 to the first mixture 107 is omitted.

The second mixture 111 can include similar solid minerals, pH and soluble calcium level to that of the first mixture 107 and/or the tailings 103. The process water 112 can be recycled or routed to a separate process (e.g., for bitumen extraction), and the second mixture 111 can be routed to further downstream processing. By separating the second mixture 111 and process water 112, the vessel 108 decreases the volume, or more specifically, the amount of water, in the second mixture 111. As such, the overall volume to be processed by downstream equipment (e.g., the dewatering device 118) is decreased. Accordingly, an overall higher volume of the tailings 103 can be processed by the system 200 relative to systems that do not remove the process water 112 in such a manner. Additionally, separation of the second mixture 111 and process water 112 from one another can decrease overall cycle time of the system 200.

As described in detail elsewhere herein, the flocculant 109 can promote thickening (e.g., increasing the solids content) of the second mixture 111, e.g., by forming bonds with colloids in the vessel 108, e.g., that were originally provided via the tailings 103. That is, the flocculant 109 can bond with the clay present in the tailings 103 to form a floc that is physically removed from the rest of the mixture. In doing so, the flocculant 109 also aids the mechanical separation of free water from the mixture. In some embodiments, the amount of flocculant 109 added to the first mixture 107 is based at least in part on solids content of the second mixture 111 and/or process water 112. For example, the flocculant 109 may be added to the mixture 107 and/or vessel 108 such that (i) the solids content of the second mixture 111 is greater than a predetermined threshold (e.g., 30%) and/or (b) solids content of the process water 112 is less than a predetermined threshold (e.g., 3%). That is, if the second mixture 111 has a solids content less than 30% solids by weight, the amount of flocculant 109 added to the first mixture 107 and/or vessel 108 may be increased, and/or if the process water 112 has a solids content greater than 3% solids by weight, the amount of flocculant 109 added to the mixture 107 and/or vessel 108 may be increased.

The process water 112 can include hydroxides (e.g., sodium hydroxide), bicarbonates from the tailings 103, and/or other compounds formed as byproducts of reacting the coagulant 105 with the tailings 103. As shown in FIG. 2A, the process water 112 can be used as a dilutant, e.g., by combining the process water 112 with the coagulant 105 to form the lime slurry previously described. Additionally or alternatively, as shown in FIG. 2B, the process water 112 can be reused for upstream processes, e.g., by combining the process water 112 with other process water 126. If heat is already present in the process water 112, recycling the process water may require less downstream heating requirements compared to using just the process water 126 without recycling. Yet another advantage of recycling the process water 112 is removing the volume of the process water 112 from the second mixture 111, which increases the solids content of the second mixture 111 and minimizes the overall volume of material that needs to be dewatered, e.g., via dewatering device 118. This decrease in volume can increase overall throughput of the system 200, thereby decreasing time and costs associated with operating the dewatering device 118. Additionally, improving the solids content, especially by forming stackable materials, can reduce anaerobic activity.

As shown in FIG. 2A, the second mixture 111 can be combined with a second coagulant 115 in a second mixer 116 to form a third mixture 117. In some embodiments, the second mixer 116 may be omitted, and the second mixture 111 and the second coagulant 115 are combined in-line (e.g., via turbulent flow or belt blending). The second coagulant 115 can be provided from a coagulant reservoir 104 and can be similar or identical to the first coagulant 105 previously described. Accordingly, the second coagulant 115 may include lime and be a lime slurry such that the lime makes up a portion (e.g., no more than 30%, 25%, 20%, 15%, 10%, or 5% by weight) of the lime slurry. The second mixer 116 can be identical or similar to the first mixer 106 previously described.

Adding the second coagulant 115 to the second mixture 111 increases the pH and soluble calcium level (i.e., the amount of calcium cations present) in the third mixture (e.g., via Reaction 4). The increase in the soluble calcium level of the third mixture relative to that of the first and second mixtures is due in part to the removal of bicarbonates via Reactions 1 and 2 that previously occurred after the first coagulant 105 was added to the first mixer 106. As such, the additional calcium cations provided via the second coagulant 115 result in a higher soluble calcium level since the calcium ions are not being consumed by the bicarbonates, which are no longer present or are present in smaller quantities relative to the first and second mixtures. The third mixture can have a pH of at least 12.0, 12.1, 12.2, 12.3, 12.4, or 12.5, and/or a soluble calcium level of at least 300 mg/L, 400 mg/L, 500 mg/L, 600 mg/L, 700 mg/L or 800 mg/L. In some embodiments, the pH of the third mixture is within a range of from about 12.0-12.5, and the soluble calcium level of the third mixture is within a range of from about 300 mg/L-1000 mg/L, 300 mg/L-700 mg/L, 400 mg/L-600 mg/L, 450 mg/L-550 mg/L, or other incremental ranges between these ranges. As a result of adding the second coagulant 115 including calcium hydroxide to the second mixture 111, or more specifically providing additional calcium cations and increasing the pH to be at least 12.0, soluble calcium is available for the sequestration of carbon dioxide, aerobic and anaerobic activity can be minimized, and chemical reactions can occur that improve the dewatering and geotechnical characteristics of the treated tailings.

An example of improved geotechnical characteristics is the pozzolanic activity that can occur at this pH level via one or both of Reactions 5 and 6.

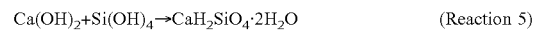

$$Ca(OH)_2 + Si(OH)_4 \rightarrow CaH_2SiO_4 \cdot 2H_2O \quad \text{(Reaction 5)}$$

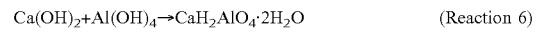

$$Ca(OH)_2 + Al(OH)_4 \rightarrow CaH_2AlO_4 \cdot 2H_2O \quad \text{(Reaction 6)}$$

The pozzolanic activity transforms the clay from the tailings into a cementitious material in situ which provides geotechnical benefits while minimizing the use of other additives. Per Reaction 5, calcium cations of the second coagulant 115 react with silicic acid ($Si(OH)_4$) functional groups of the clay (e.g., kaolinite ($Al_2Si_2O_5(OH)_4$) or illite ($(K,H_3O)(Al,Mg,Fe)_2(Si,Al)_4O_{10}[(OH)_2,(H_2O)]$)) provided via the tailings 103 to produce calcium silicate hydrates ($CaH_2SiO_4 \cdot 2H_2O$). Per Reaction 6, calcium cations of the second coagulant 115 react with aluminate ($Al(OH)_4$) functional groups of the clay provided via the tailings 103 to produce calcium aluminum hydrates ($CaH_2AlO_4 \cdot 2H_2O$). In addition to Reactions 5 and 6, calcium cations provided via the second coagulant 115 can replace cations (e.g., sodium and potassium cations) on the surface of the clay provided via the tailings 103. Pozzolanic reactions (e.g., Reactions 5 and 6) will only occur in an environment having a pH of at least about 11.8, 11.9, or 12.0. Without being bound by theory, this is because such a pH increases the solubility of silicon and aluminum ions to be sufficiently high and provide the driving force for the pozzolanic reactions to occur.

As a result of Reactions 5 and 6, the stability of the clay is chemically modified. This chemical modification of the clay can cause the particle size of the clay to increase, and the water layer of the clay particles to generally decrease. Furthermore, as explained in detail elsewhere herein, the produced calcium silicate hydrates and/or calcium aluminum hydrates exhibit properties associated with a cementation matrix that are substantially irreversible. Generally speaking, the pozzolanic reactions therefore increase the shear strength of the third mixture and the downstream product streams. The pozzolanic modification of the clays can enable more effective dewatering and may provide benefits for reclamation and other use applications. Each of these characteristics can have greenhouse gas benefits.

In some embodiments, increasing the pH of the second mixture 111, or more specifically, the tailings portion of the second mixture 111, above 12.0 may decrease the amount of microbes present in the second mixture 111 (and/or tailings portion) by creating an alkaline environment in which the microbes cannot survive, or at least not flourish. As previously described, the microbes present in the tailings 103 can anaerobically degrade organic material of the untreated tailings 103 to produce biomass methane and/or other GHG which may be released to the atmosphere. An advantage of embodiments of the present technology is that, by increasing the pH of the second mixture 111 to be above 12.0, all or a portion of the microbes may be unable to survive and thus the amount of methane or other GHGs produced by the microbes is decreased.

Other coagulants, such as alum, gypsum, and calcium chloride do not provide the chemical environment to capture carbon dioxide as described above. For tailings treated with gypsum or calcium chloride, for example, though some insoluble calcium carbonates can be formed, the calcium cations from these compounds will generally solubilize as bicarbonates at a lower pH (i.e., less than 11.5) and their addition to tailings will not enable the pH of the treated mixture to rise above 11.0 to facilitate pozzolanic reactions and dewatering. For tailings treated with alum ($Al_2(SO_4)_3$), sulfuric acid is produced which actively decreases pH of the treated mixture. As a result of not having a sufficiently high pH to drive the reaction to form insoluble calcium carbonates, calcium released by cation exchange forms soluble calcium sulfate and bicarbonate. Carbon dioxide present beyond the reactions with soluble calcium can be released as a gas, thus lowering pH and resulting in additional greenhouse gas emissions. Furthermore, treating tailings with alum, gypsum, and/or calcium chloride are unable to raise pH to a high level where microbes count is reduced or their activity hindered. Instead these coagulants reduce pH providing better conditions for aerobic and anaerobic microbial activity.

An advantage of the adding the first coagulant 105, flocculant 109, and second coagulant 115 in a step-wise manner, as opposed to adding only a single coagulant, is the decreased cycle time of the overall system 200. That is, adding the flocculant 109 (after adding the first coagulant 105) to the vessel 108 allows the flocculant 109 to flocculate the solution in the vessel 108 without the significant presence of soluble calcium ions, which results in a more desirable floc formation and improved settling of solids in the second mixture 111. Additionally, since the second coagulant 115 is combined with the second mixture 111 after removing bicarbonates (e.g., via the process water 112 and/or first mixer 106), the bicarbonates do not limit the effectiveness of the second coagulant 115 to promote pozzolanic reactions, as may be the case if only a single lime dosage was used.

As further shown in FIG. 2A, the third mixture 117 is conveyed (e.g., via gravity and/or a pump) from the second mixer 116 to the dewatering device 118, or to other treatment processes, e.g., via a dewatering device bypass. The other treatment processes can include, e.g., thin lift deposition, thick lift deposition, deep deposition, or water-capping technologies. The dewatering device 118 can include a centrifuge, a filtration device or system, in-line flocculation and/or other similar devices or systems that provide a physical separation force on the second mixture 117 to promote dewatering. The dewatering device 118 can separate the second mixture 117 into the first stream 119 and the second stream 120 (e.g., a centrate or a filtrate), as previously described with reference to FIG. 1. Embodiments including a centrifuge can include a scroll centrifugation unit, a solid bowl decanter centrifuge, screen bowl centrifuge, conical solid bowl centrifuge, cylindrical solid bowl centrifuge, a conical-cylindrical solid bowl centrifuge, or other centrifuges used or known in the relevant art. Embodiments including a filtration device or system can include a vacuum filtration system, a pressure filtration system, belt filter press, or other type of filtering apparatus known in the relevant art. In some embodiments, the filtration system can include a Whatman 50, 2.7 micron filter or similar device able to subject the second mixture 117 to at least about 100 psig of air pressure.

In those embodiments including the second mixer 116, the third mixture 117 may be transferred to the dewatering device 118 immediately after mixing in the second mixer 116 (e.g., based on a measured composition taken at an outlet of the second mixer 116) or after a predetermined period of time. In some embodiments, the residence time of the third mixture 117 in the second mixer 116 may be less than 5 minutes, 30 minutes, or one hour. In some embodiments, the third mixture 117 may be retained for more than one hour, e.g., one day, one week, one month, or longer. In general, the third mixture 117 may be retained for any desired amount of time to ensure it has been sufficiently modified for the dewatering device 118 to separate a sufficient or optimal amount of water from the solids of the third mixture 117.

The dewatering device 118 has a first outlet that receives the first stream 119, and a second outlet that receiver the second stream 120. The first stream 119 can be a solid, soft solid, cake, or pumpable fluid material composed of the some or all of the particulate matter provided via the tailings 103, such as sand, silt, (chemically modified) clay, and residual bitumen and froth treatment diluent, as well as soluble calcium ions provided via the first and second coagulants 105, 115. The first stream 119 can include a solids content of at least 40%, 45%, 50%, 55%, 60%, 65%, 70%, 75%, 80%, 85%, 90%, or 95% by weight. More generally, the first stream 119 may include a greater percentage of solids by weight than the percentage of liquids by weight. Characteristics (e.g., geotechnical characteristics) of the first stream are described in additional detail with reference to U.S. application Ser. No. 15/566,578 (incorporated by reference herein). The first stream 119 may be provided to a pond or holding area (e.g., a diked area, temporary storage, and/or reclamation area) via a pump, belt, truck, and/or other conveying system(s). In some embodiments, the mixture 117 can be placed on one or more pads in thin/thick lifts to consolidate and dry the solids content contained therein.

In some embodiments, the first stream 119, which may be alkaline thickened tailings, stackable mine tailings, a sediments mixture or the like, can exist in an aerobic state or condition. Additionally, the first stream 119 can include fermentable or biodegradable organic material (as previously described), and microbes able to aerobically digest or degrade the organic material. The microbes present in the first stream 119 may be the same or different than the microbes present in the untreated tailings 103, as previously described. In some embodiments, the microbes of the first stream 119 can aerobically degrade the organic material of the first stream 119 to produce carbon dioxide (e.g., biomass carbon dioxide). In such embodiments, the produced carbon dioxide may be sequestered by soluble calcium ions in the first stream 119 and used to produce a stable mineral, such as calcium carbonate ($CaCO_3$) according to Reactions 7 and 8. That is, carbon dioxide absorbed into the process water as carbonic acid (Reaction 7) or produced via aerobic digestion of an organic material of the first stream 119 can react with calcium hydroxide (e.g., excess soluble calcium ions) present in the first stream 119 to produce calcium carbonate and water (Reaction 8). Reaction 7 lowers the pH of the first stream to facilitate the aerobic and/or anaerobic reactions required for the production of carbon dioxide. As such, the produced carbon dioxide may not be released to the atmosphere, as would occur if excess calcium ions were not present and/or if the pH of the first stream 119 was less than about 11.0. Instead, according to embodiments of the present technology, the produced carbon dioxide may be used to form stable minerals (e.g., calcium carbonate) for industrial uses. Accordingly, an advantage of embodiments of the present technology, in addition to those previously described, is the ability to prevent the release of carbon dioxide from treated tailings and to produce stable minerals.

$$Ca(OH)_2 + H_2CO_2 \rightarrow CaCO_3 \cdot 2H_2O \quad \text{(Reaction 7)}$$

$$Ca(OH)_2 + CO_2 \rightarrow CaCO_3 + H_2O \quad \text{(Reaction 8)}$$

The second stream 120 can include a solids content less than 10%, 5%, 4%, 3%, 2%, or 1% by weight. The solids content may include particulate matter such as sand, silt, clay, carbonates, residual organic materials and froth treatment diluent, and/or calcium ions. The second stream 120 can be directed to a pond or holding area different than the first stream 119, and/or be used as process recycle water 122. As shown in FIG. 2A, the recycle 122 can be combined with (a) the tailings reservoir 102 via line 122a, (b) the tailings 103 via line 122b, (c) the coagulant reservoir 104 via line 122c, (d) the first coagulant 105 via line 122d, (e) the coagulant reservoir 114 via line 122e, and/or (f) the second mixture 117 via line 122f. Advantageously, combining the recycle 122 with the tailings 103 can increase the pH of the tailings 103, which can enable soluble calcium cations of the recycle 122 to react with bicarbonates present in the tailings 103 and thereby form insoluble compounds that precipitate out of solution and separate from the tailings 103. Reducing the amount of bicarbonates in the tailings 103 can reduce the amount of the first and second coagulants 105, 115 needed for enhanced dewatering to occur, which in turn can reduce operation costs for the system 200. In some embodiments, the second stream 120 may also be treated with carbon dioxide to reduce the pH and/or the amount of soluble calcium cations of the second stream 120. This can be done by natural absorption of carbon dioxide from the atmosphere, or actively injecting carbon dioxide (e.g., from industrial emissions such as flue gas from coal or petroleum coke fired boilers) into the second stream 120. Carbon dioxide lowers the pH of the process water by the formation of carbonic acid, which removes soluble calcium by forming insoluble calcium carbonate. The reaction of carbonic acid also reacts with sodium hydroxides in the second stream 120 resulting in the formation of sodium bicarbonates as the pH decreases. Sodium bicarbonate, removed by hydrated lime in Reaction 1 above, provides a chemical buffer system to moderate the impact of pH changes on the system.

The system 200 can include the control system 130, as previously described with reference to FIG. 1. The control system 130 can be used to control operation of the system 200. For example, the control system 130 can control (e.g., regulate, limit and/or prevent) the flow of fluids (e.g., tailings 103, first coagulant 105, first mixture 107, flocculant 109, second mixture 111, second coagulant 115, third mixture 117, first stream 119, second stream 120, recycle 122, etc.) to and/or from different units (e.g., tailings reservoir 102, coagulant reservoir 104, first mixer 106, vessel 108, flocculant reservoir 110, second mixer 116, dewatering device 118, etc.) of the system 200. Additionally, the control system 130 can control operation of individual units (e.g., the first mixer 106, second mixer 116, dewatering device 118, etc.).

Figure 3:
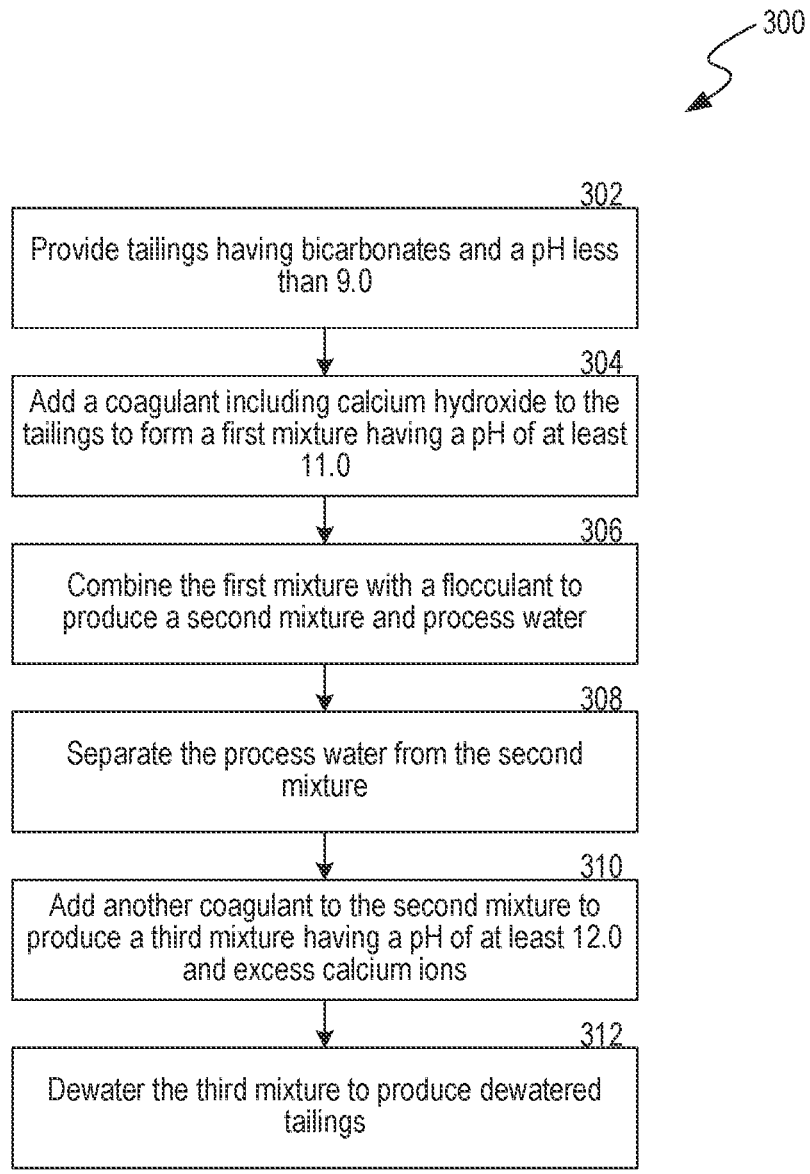
FIGS. 3-5 are flow diagrams of methods for treating sediment mixtures, in accordance with embodiments of the present technology.

FIG. 3 is a flow diagram of a method 300 for dewatering tailings with a coagulant, in accordance with embodiments of the present technology. The method 300 includes providing tailings (e.g., the tailings 103; FIGS. 1 and 2A) having bicarbonates and a pH less than 9.0 (process portion 302), and adding a first coagulant (e.g., the first coagulant 105; FIGS. 1 and 2A) including calcium hydroxide to the tailings to form a first mixture (e.g., the first mixture 107; FIGS. 1 and 2A) (process portion 304). For embodiments in which the tailings are provided as a continuous flow or stream, the coagulant may be added as a continuous flow or stream, and for embodiments in which the tailings are provided in batches, the coagulant may be added in individual batches. Adding the first coagulant including calcium hydroxide to the tailings can cause the pH of the tailings to increase to be at least about 11.0 (e.g., 11.5), and cause Reactions 1-4, as previously described, to occur within the first mixture.

The method 300 can further include combining the first mixture with a flocculant (e.g., the flocculant 109; FIG. 2A) to produce a second mixture (e.g., the second mixture 111; FIG. 2A) and process water (e.g., process water 112; FIG. 2A) (process portion 306). As explained elsewhere herein, the flocculant can react with clay colloids to form a floc, which can be physically removed along the entrained water (e.g., free water and water molecules produced via Reactions 1 and 2) and promote the mechanical separation of the clay colloids from the mixture. In doing so, the first mixture can separate into the second mixture and the process water. In some embodiment, the method 300 may omit process portion 306.

The method 300 further includes separating or removing the process water from the second mixture (process portion 308). As explained elsewhere herein, this can be done by conveying the second mixture to a downstream container or mixer (e.g., the second mixer 116; FIG. 2A) and/or removing the process water from a vessel (e.g., the thickener vessel 108; FIG. 2A) containing the second mixture and process water. As a result of Reactions 1-4 and removing the process water from the second mixture, the second mixture may include less bicarbonates than the first mixture.

The method 300 can further comprise adding a second coagulant (e.g., the second coagulant 115; FIG. 2A) including calcium hydroxide to the second mixture to produce a third mixture (e.g., the third mixture 117; FIG. 2A) (process portion 310). As described elsewhere herein, adding the second coagulant including calcium hydroxide to the tailings, or more specifically, providing additional calcium cations and increasing the pH to be at least 12.0, can reduce microbial activity and enable pozzolanic activity to occur, e.g., via Reactions 5 and/or 6, as previously described. In some embodiments, process portions 304 and 308 may be combined in a single step such that a coagulant is added to the lime-tailings mixture to produce the third mixture having a pH of at least 12.0.

The method 300 can further include dewatering the third mixture to produce a first stream (e.g., the first stream 119; FIG. 2A) having a solids content of at least 40% by weight, and a second stream (e.g., the second stream 120; FIG. 2A) have a solids content less than 10% by weight. Dewatering the third mixture can occur via a dewatering device (e.g., the dewatering device 118; FIG. 2A) or other treatment processes including, e.g., thin lift deposition, thick lift deposition, deep deposition, or water-capping technologies. The first stream may be provided to a pond or holding area (e.g., a diked area, temporary storage, and/or reclamation area) via a pump, belt, truck, and/or other conveying system(s). Pumping the first stream to the external site can shear the first stream and thereby cause resuspension of the solid minerals of the first stream originally provided via the tailings. In some embodiments, the first stream can have an undrained shear strength and/or shear stress that increases over a period of time (e.g., 1 day, 2 days, 3 days, 4 days, 5 days, 6 days, 1 week, 2 weeks, 3 weeks, 1 month, 2 months, 3 months, 6 months, 1 year, or longer). After dewatering (e.g., less than 1 day after dewatering), the undrained shear strength (e.g., peak, average, remolded, or residual undrained shear strength) and/or shear stress (e.g., peak, average, remolded, or residual undrained shear stress) for the third mixture and/or second stream can be, e.g., at least 200 Pa, 500 Pa, 1 kPa, 2 kPa, 2.5 kPa, 3.0 kPa, 3.5 kPa, 4.0 kPa, 4.5 kPa, 5.0 kPa, 5.5 kPa, 6.0 kPa, 6.5 kPa, or 7.0 kPa, as explained in detail elsewhere herein (e.g., with reference to FIGS. 4A-14). Additionally, after dewatering (e.g., more than 1 day after dewatering), the undrained shear strength and/or shear stress for the third mixture and/or second stream can be, e.g., at least 5 kPa, 10 kPa, 20 kPa, 30 kPa, 40 kPa, 50 kPa, 60 kPa, 70 kPa, 80 kPa, 90 kPa, 100 kPa, or 110 kPa. The lower initial shear strength and/or shear stress can be beneficial, as this allows the third mixture and/or second stream to be pumpable, e.g., from the centrifuge to a containment area, as described with reference to FIG. 2A.

In some embodiments, one or more process portions of the method 300 may be omitted. For example, the method 300 may comprise only a single coagulant or lime addition to the tailings. In such embodiments, process portion 310 may be omitted. Additionally or alternatively, in such embodiments, process portion 306 and/or process portion 308 may be omitted, such that the first mixture having a pH of at least 11.0 is dewatered via process portion 312.

Figure 4:
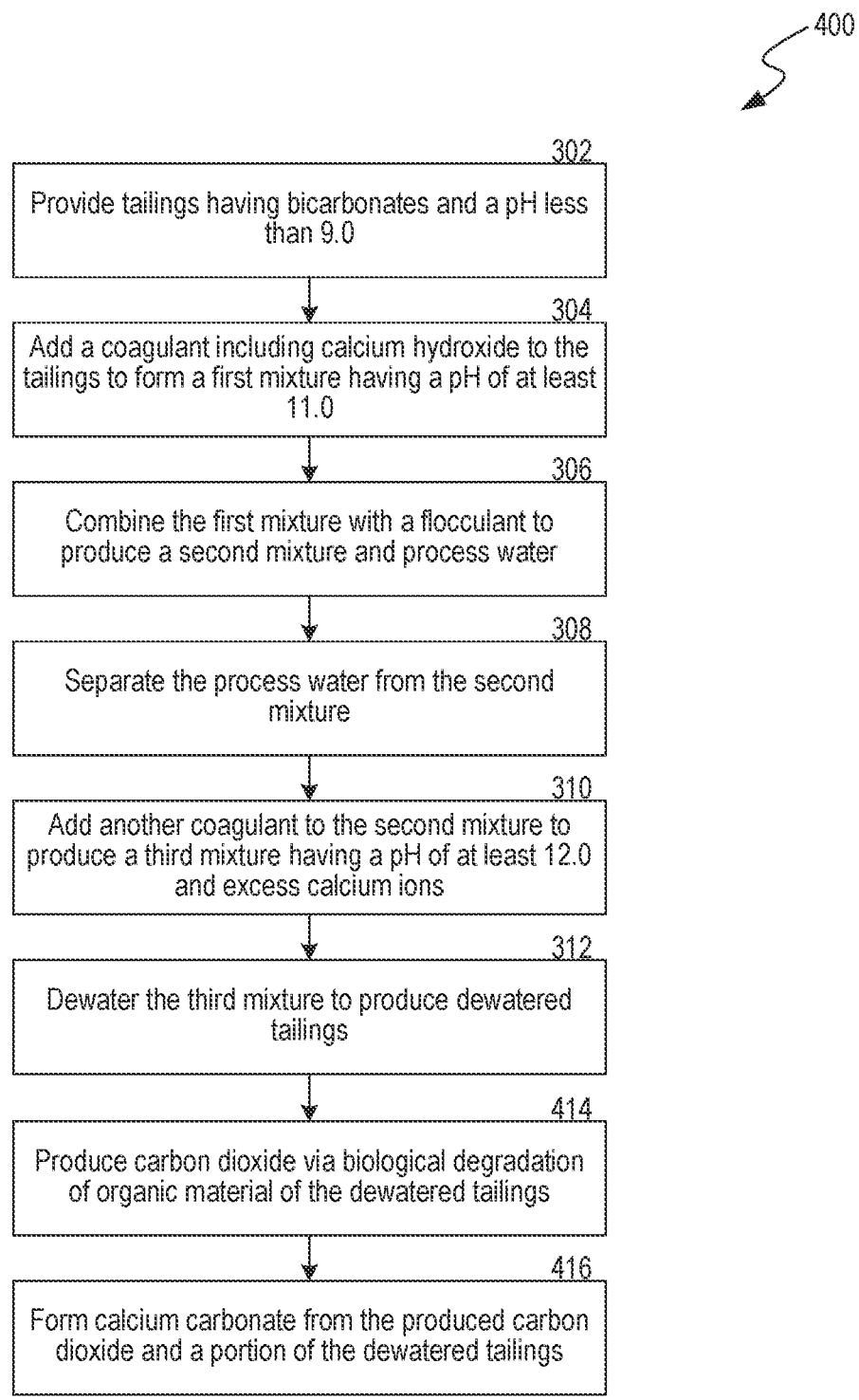

FIG. 4 is a flow diagram of a method 400 for dewatering tailings with a coagulant, in accordance with embodiments of the present technology. The method 400 can include process portions 302, 304, 306, 308, 310 and/or 312 as previously described with reference to FIG. 3. As shown in FIG. 4, the method 400 can further comprise producing carbon dioxide (e.g., gaseous carbon dioxide or carbon dioxide biomass) via biological degradation of organic material of the dewatered tailings (process portion 414). In some embodiments, microbes present in the dewatered tailings may cause the degradation of the organic material and produce the carbon dioxide. In such embodiments, the microbes can aerobically degrade the organic material. That is, the microbes of the dewatered tailings may not anaerobically degrade the organic material of the dewatered tailings, at least because the dewatered tailings comprise thickened tailings or stackable mine tailings in an aerobic state.

The method 400 can further comprise forming calcium carbonate from the produced carbon dioxide and a portion of the dewatered tailings (process portion 416). As previously described, the dewatered tailings can include excess calcium ions and, as a result, a pH above 11.0. As such, the produced carbon dioxide can react with the calcium ions to form calcium carbonate. In doing so, the dewatered tailings can sequester the carbon dioxide produced via microbiological degradation, and thus inhibit or prevent the carbon dioxide from being released to the outside environment.

Figure 5:
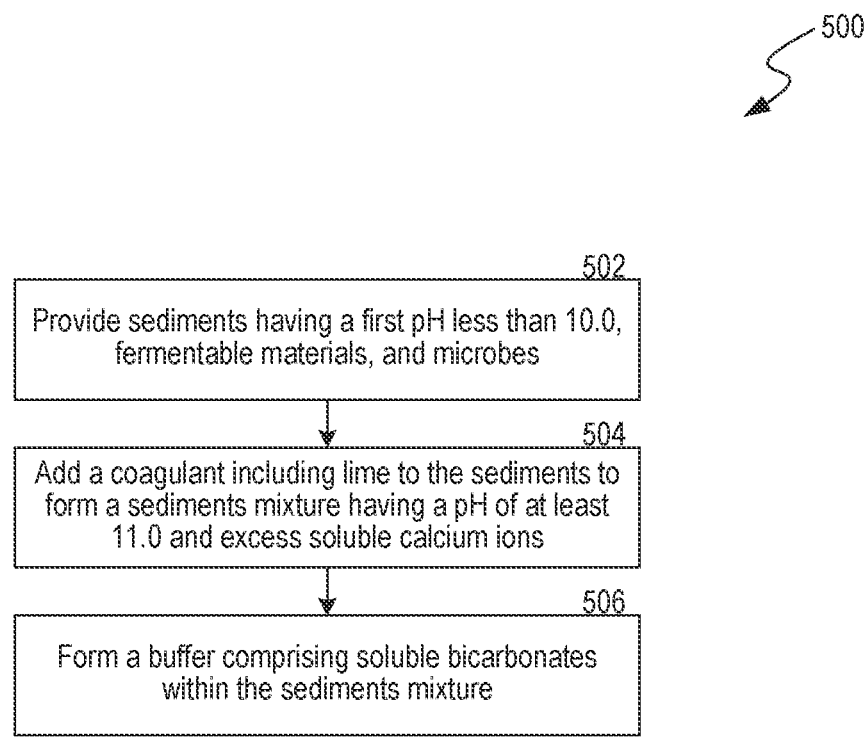

FIG. 5 is a flow diagram of a method 500 for treating sediments with a coagulant, in accordance with embodiments of the present technology. The method 500 can include providing sediments having a first pH less than 10.0, fermentable materials, and microbes. The sediments can comprise tailings (e.g., the tailings 103; FIGS. 1-2B), sand, clay, silt, organic materials, soluble bicarbonates, and other soil particles. The microbes can include bacteria, methanogenic archaea, and/or other micro-organisms that degrade the fermentable and/or fermented materials in aerobic and/or anaerobic conditions, respectively, to form undesirable GHG (e.g., carbon dioxide and methane) emissions. For example, the fermentable materials of the sediments can be degraded via bacterium to produce carbon dioxide, and fermented materials of the sediments can be degraded to produce methane. Such anthropogenic disruptions of sediments and/or aquatic environments generally can increase the quantity of organic materials in sediments, and the potential release of GHG from the large quantities of negatively affected sediments (and residual industrial material) by the processes can contribute to climate change.

The method 500 can further comprise adding a coagulant including lime to form a sediments mixture having a pH of at least 11.0 and excess soluble calcium ions (process portion 504). The coagulant can be the coagulant 105 described elsewhere herein, e.g., with reference to FIGS. 1-2B. The addition of the coagulant, specifically lime, increases the pH of the sediment mixture such that the fermentable materials and/or fermented materials originally present in the sediments are inhibited from producing GHG emissions. The conversion of fermentable materials and/or fermented materials through aerobic and anerobic microbiological processes, respectively, is generally impacted by pH and chemistry of the sediments mixture. The aerobic conversion of materials though fermentation is typically performed by bacteria at an optimal pH between 5 to 6.5 to produce carbon dioxide, as well as other products such as acetate and citrate. The second conversion of the fermented products into methane, referred to as methanogenesis, only occurs once the sediments mixture or environment has become anaerobic. This methanogenesis can be performed by archaea and optimally occurs around a neutral pH of 6-8, though some methanogens have been observed to be able to produce methane up to a pH of 9.0, 9.5, or 10.0. As such, the combined process of aerobic fermentation and anaerobic methanogenesis will typically display optimal performance between a pH of 6.8 to 8, based on plant operations and other factors.

Embodiments of the present technology inhibit these fermentable and/or fermented materials from producing GHG. That is, by increasing the pH of the sediments mixture via the addition of the coagulant, the microbes (e.g., bacteria, archaea, and/or other organisms) of the sediments, are unable to degrade or otherwise process the fermentable and/or fermented materials to cause the production and released of GHG. Instead, these microbes remain substantially dormant in the sediments mixture. Additionally or alternatively, in some embodiments, adding the coagulant to the sediments and thereby increasing the pH can also decrease the amount of microbes.

The method 500 can further comprise forming a buffer comprising soluble bicarbonates within the sediments mixture (process portion 506). As the pH of the sediments mixture is reduced through absorption of carbon dioxide from the atmosphere, the bicarbonate buffer is regenerated. Forming the buffer can comprise decreasing the pH, e.g., from the pH of at least 11.0, to approximately 8.0, 8.5, 9.0, 9.5, 10.0 or greater. In doing so, the buffer can maintain pH stability in the aqueous environment of the sediments mixture, and thereby prevent the pH of the sediments mixture from further decreasing to a pH below about 9.5, 9.0, or 8.5 at which GHG can be optimally produced via aerobic and/or anaerobic degradation of fermentable and/or fermented material of the sediments mixture. As explained elsewhere herein (e.g., with reference to FIG. 7), the pH of the sediments mixture can naturally decrease over time to a pH below about 9.5, or more specifically between about 8.0-9.0. As such, the buffer system formed by the reaction between soluble calcium or sodium ions and carbon dioxide can better ensure the sediments mixture over time maintains a pH level that will limit the release of GHG.

The calcium carbonate of the buffer system can be formed by reacting carbon dioxide with the excess soluble calcium ions provided the coagulant in process portion 504, as previously described by Reactions 7 and 8. As previously described, the carbon dioxide can be produced via the aerobic degradation of the fermentable materials. In such embodiments, the produced carbon dioxide may be sequestered by soluble calcium ions in the sediments mixture and used to produce a stable mineral, such as calcium carbonate ($CaCO_3$) according to Reactions 7 and 8, as previously described. That is, carbon dioxide absorbed into the water of the sediments mixture as carbonic acid (Reaction 7) or produced via aerobic digestion of an organic material of the sediments mixture can react with calcium hydroxide (e.g., excess soluble calcium ions) to produce calcium carbonate and water (Reaction 8). Reaction 7 lowers the pH of the first stream to facilitate the aerobic and/or anaerobic reactions required for the generation of carbon dioxide in Reaction 8. As such, the produced carbon dioxide may not be released to the atmosphere, as would occur if excess calcium ions were not present and/or if the pH of the sediments mixture was less than about 11.0. Instead, according to embodiments of the present technology, the produced carbon dioxide may be used to form stable minerals (e.g., calcium carbonate), which can be sequestered in the sediment or used for industrial uses. Accordingly, an advantage of embodiments of the present technology, in addition to those previously described, is the ability to prevent the release of carbon dioxide from treated tailings and to sequester soluble carbonates as stable minerals.

Additionally or alternatively to forming calcium carbonate via carbon dioxide produced via aerobic degradation, in some embodiments calcium carbonate may be formed via carbon dioxide present in the atmosphere or industrial emissions. As an example, the excess calcium ions of the sediments mixture can react with carbon dioxide present in the atmosphere to produce calcium carbonate, according to Reaction 7 (previously described). As the pH of the system causes the carbon dioxide from these sources to decrease, the sodium hydroxide formed in Reactions 1 and 3 (previously described) will also react with the carbonic acid of the tailings to reform sodium bicarbonates and therein moderate pH changes in the process water of the sediments mixture. Stated differently, the sodium bicarbonates act as a buffer system to moderate pH changes of the sediments mixture and thereby prevent the pH from dropping too low, e.g., to a pH where methanogenesis can occur to produce methane. To explain, the sodium bicarbonate can be destabilized through either acidic or basic conditions, but will only regenerate when destabilized by an alkaline additive, such as the addition of lime. In the case of lime addition, any excess alkaline calcium is neutralized by carbon dioxide, the absorption of which forms carbonic acid that reacts with soluble calcium to precipitate as calcium carbonate. With the production of calcium carbonate, the buffer system would only contain alkaline sodium, which would continue to react with the carbonic acid to reform the stable sodium bicarbonate buffer.

Figure 6:
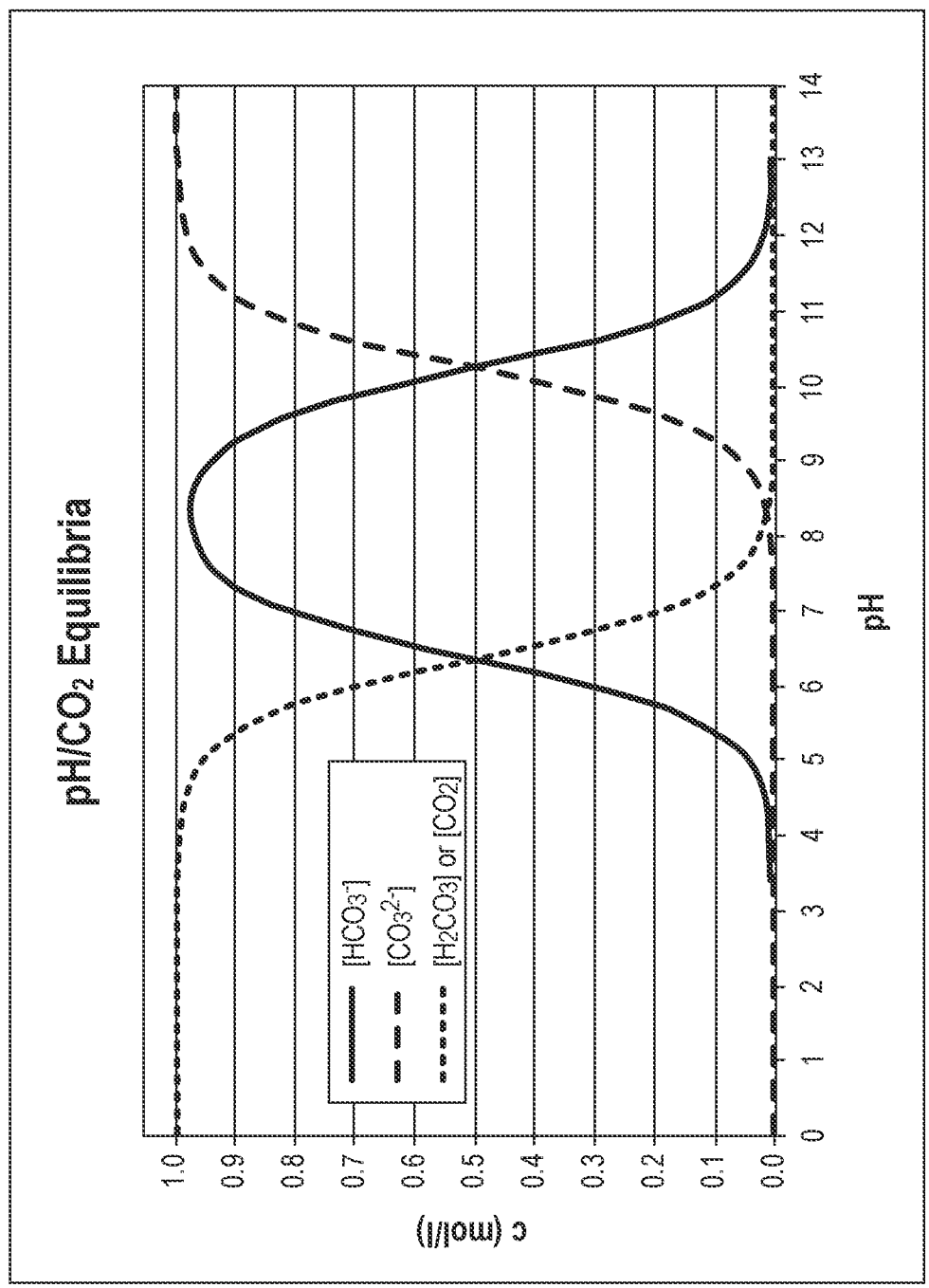
FIG. 6 is a chart illustrating the relationship between pH and bicarbonates, carbonates, and carbonic acids or carbon dioxide, in accordance with embodiments of the present technology.

FIG. 6 is a chart illustrating the relationship between pH and bicarbonates ($HCO_3^-$), carbonates ($CO_3^{2-}$), and carbonic acids ($H_2CO_3$) or carbon dioxide, in accordance with embodiments of the present technology. In aqueous environments, carbonic acid, bicarbonate, and carbonate comprise a buffer system in which the individual species are all derived from carbon dioxide. The pH of such a buffer system is balanced by the presence of both a weak acid (e.g., carbonic acid) and its conjugate base (e.g., bicarbonate) such that any excess acid or base added to the buffer system is neutralized.

The effect of the calcium-based coagulant on the pH of the sediments mixture is also important for sequestration of carbon dioxide and control of pH in aqueous systems. As shown in FIG. 6, (i) at a high pH above 11.0, carbon dioxide exists primarily as carbonates ($CO_3^{2-}$), (ii) at an intermediate pH between 5.0 and 11.0 carbon dioxide is primarily in the form of bicarbonates, and (iii) at a pH below 5 carbon dioxide remains in an aqueous gas form that could lead to GHG emissions. Calcium hydroxide drives the pH up providing a unique benefit of sequestering each form of carbonate in these systems. The addition of calcium hydroxide at low, intermediate and high pH results in the removal of carbon dioxide as insoluble calcium carbonates. Excess soluble calcium ions generally do not take effect until the carbonates in the process water are depleted as the pH reaches 11.0 or higher. Excess soluble calcium ions and high pH levels (e.g., 11 or higher) are reduced over time as acidic carbonic acids are formed from the absorption of carbon dioxide from the atmosphere. These carbonic acids in aqueous sediments and tailings react with the excess calcium hydroxide to form insoluble calcium carbonate and water. As the pH decreases from these reactions a sodium and calcium bicarbonate buffer system develops which moderates further pH decline, and can deter optimal pH levels for aerobic and anaerobic digestion from being reached. It is worth noting that other calcium-based products, like gypsum and calcium chloride, cannot reach a pH 11.0 without the addition of an alkali. The intermediate pH levels achieved by these materials results in significantly less sequestration of carbon dioxide as calcium carbonate.

Figure 7:
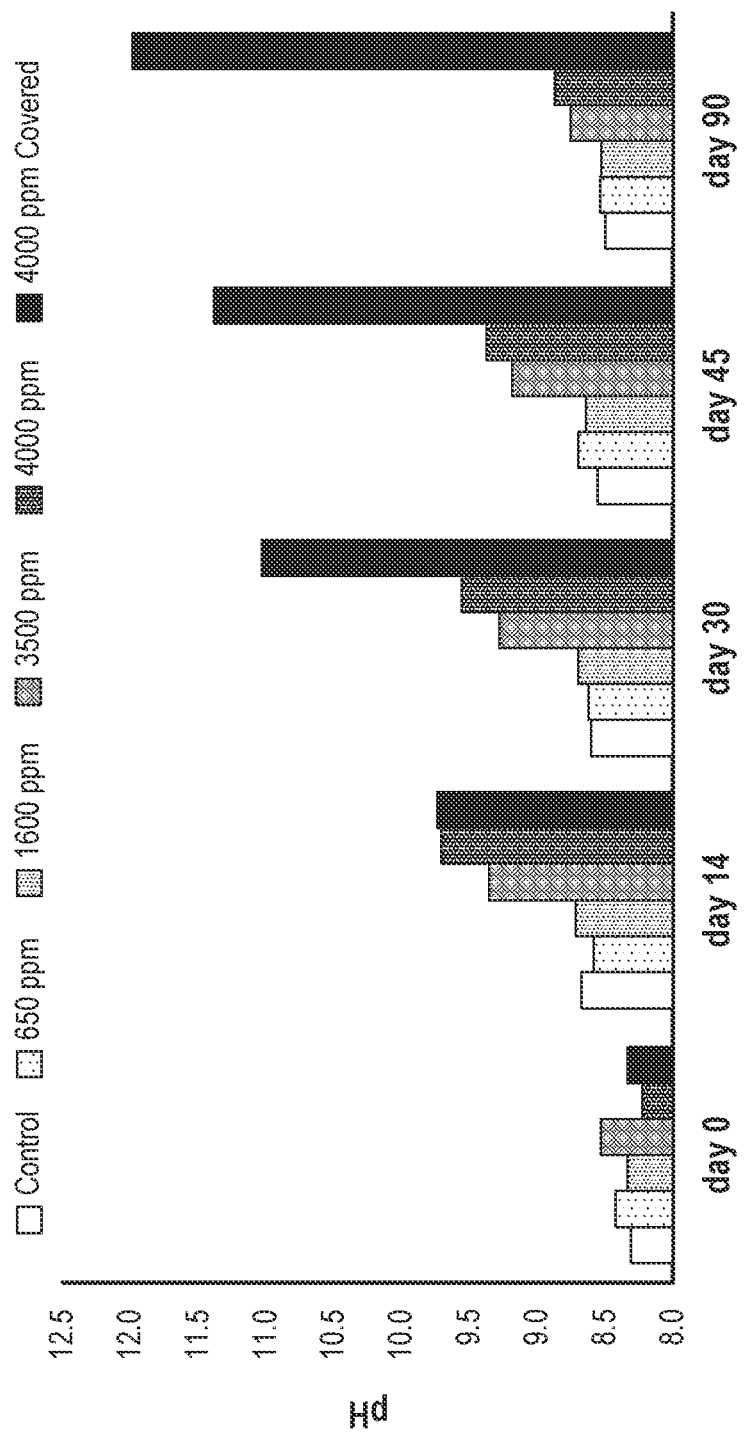
FIG. 7 is a chart illustrating the relationship between pH and various doses of lime, in accordance with embodiments of the present technology.

FIG. 7 is a chart illustrating the relationship between pH and various doses of lime added to tailings, in accordance with embodiments of the present technology. As shown in FIG. 7, various dosages of lime were added to a tailings sample, and pH of a water cap placed over the treated tailings was monitored over time at days 0, 14, 30, 45, and 90. The dosages of lime include a control (0 ppm) dosage, a 650 ppm dosage, a 1600 ppm dosage, a 3500 ppm dosage, a 4000 ppm dosage, all of which were exposed to air (i.e., uncovered), and a 4000 ppm dosage that was not exposed to air (i.e., covered). Migration of high pH pore water in the tailings increased the pH of the neutral pH cap water over time. As shown in FIG. 7, after an increase in pH over the first fourteen days, pH of all the samples except the 4000 ppm covered sample steadily deceased over time. This is likely due to the absorption of carbon dioxide from the atmosphere reacting with soluble calcium hydroxide to form insoluble calcium carbonates which moderated the increase in pH in the cap water. Notably, the 4000 ppm covered sample exhibited an increase in pH over the entire 90 day period. Without being bound by theory, this increase is likely due to the sealed sample preventing carbon dioxide from atmosphere being absorbed into the cap water. In doing so, the sealed sample is able to maintain a pH above the optimal pH range (i.e., 6-8.5) for aerobic and/or anaerobic digestion, and therein inhibit undesirable GHG emissions. The sealed sample generally corresponds to the buffer system described elsewhere herein (e.g., with reference to FIGS. 5 and 6) which, as previously described, also inhibits the pH from reaching the optimal pH range for aerobic and/or anaerobic digestion.

Figure 8B:
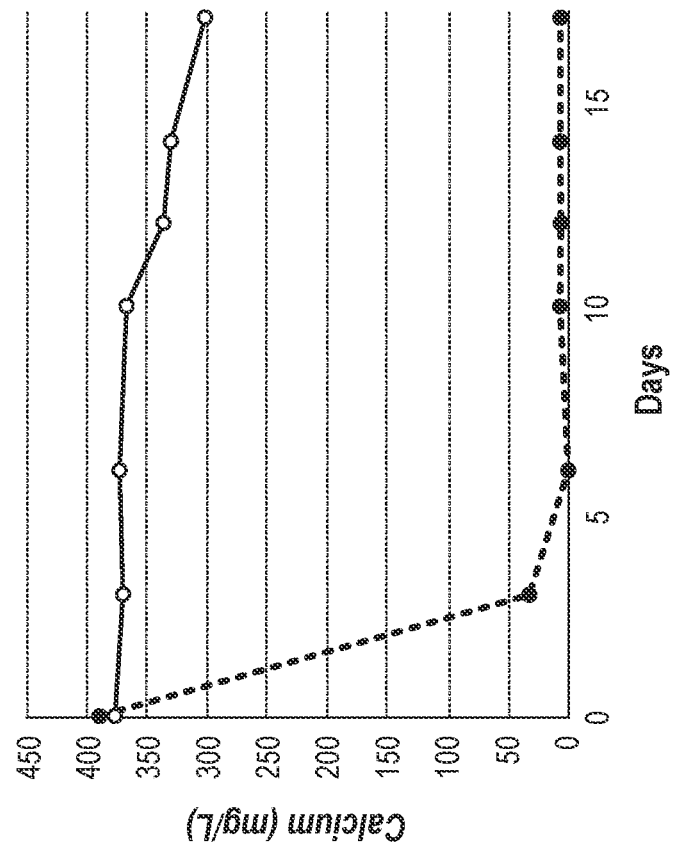
FIGS. 8A and 8B are graphs illustrating the effect of exposure to the atmosphere on the pH and calcium concentration of lime-treated samples, in accordance with embodiments of the present technology.
Figure 8A:
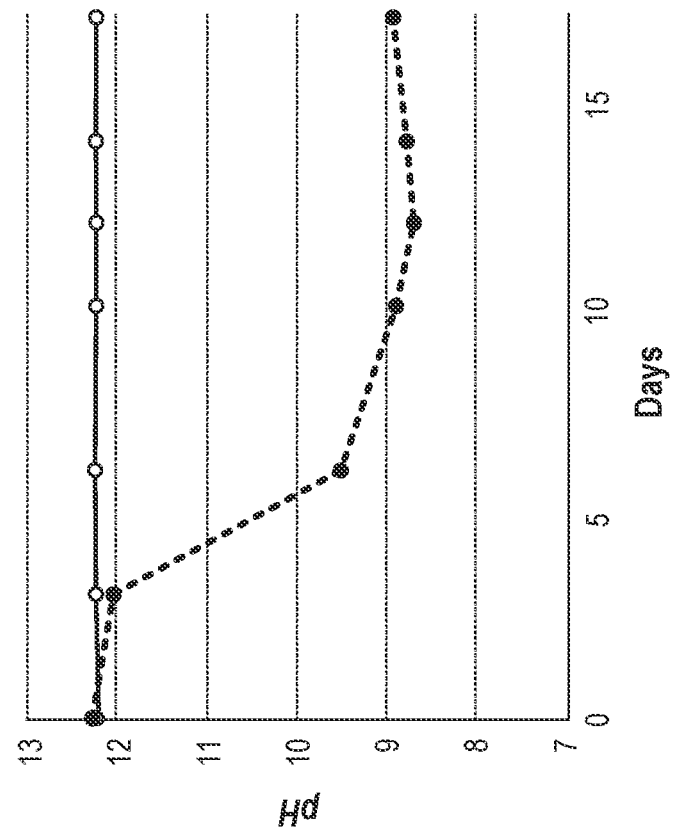

FIGS. 8A and 8B are graphs illustrating the effect of exposure to the atmosphere on the pH and calcium concentration of lime-treated water, in accordance with embodiments of the present technology. As shown in FIGS. 8A and 8B, the exposed sample exhibited a drop in pH from 12.0 to 9.0 over 20 days and a depletion of calcium, whereas the sealed sample exhibited a substantially constant pH over 20 days and only a slight decrease in calcium concentration. FIG. 8A shows that exposure to the atmosphere lowers the pH of the treated sediments due to the absorption of carbon dioxide from the atmosphere. The sealed sample prevents atmospheric carbon dioxide from being absorbed into the water and thus prevents the formation of carbonic acid. As a result, without the carbonic acid formation, the pH of the sealed sample remained the same. FIG. 8B shows that the soluble level of calcium decreased significantly (from about 375 mg/L to 0 mg/L) over time with the exposed sample, whereas the soluble level of calcium for the sealed sample decreased only slightly (from about 375 mg/L to 300 mg/L). The drop in calcium level for the exposed sample is due to the formation of calcium carbonates, which utilize the calcium ions and are insoluble in water. By contrast, the soluble calcium levels of the sealed sample remained relatively elevated, as the calcium ions are unable to react with carbon dioxide from the atmosphere.

Figure 9:
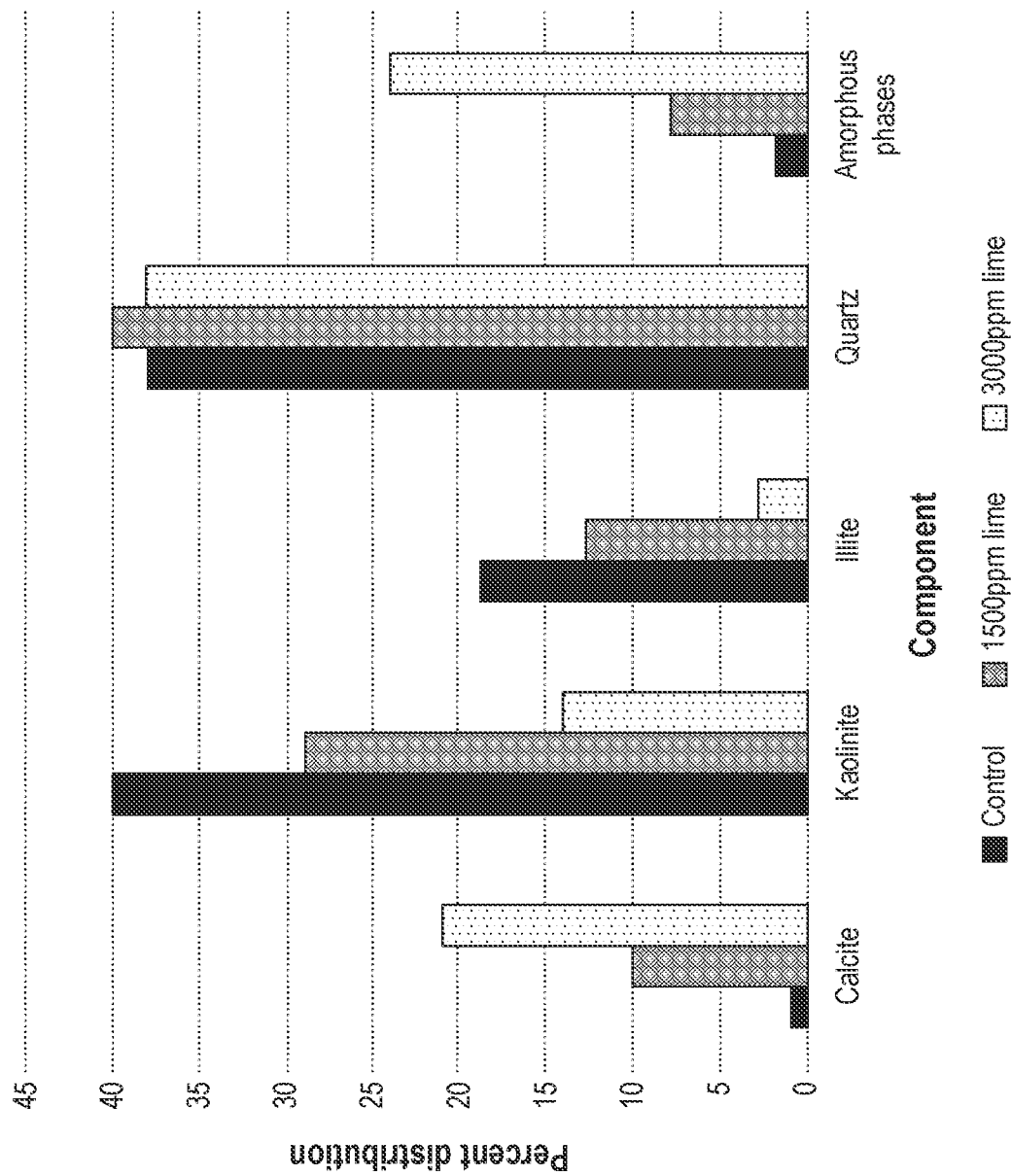
FIG. 9 is a chart illustrating varying amounts of particular minerals in different lime-treated samples, in accordance with embodiments of the present technology.

FIG. 9 is a chart illustrating amounts of particular minerals in different lime-treated tailings samples, in accordance with an embodiment of the present technology. The lime-treated tailings samples of FIG. 9 each have a pH of at least 11.0 (e.g., a 1500 mg/L lime dosage has a pH of about 11.5 and a 3000 mg/L lime dosage has a pH of about 12.5) and excess soluble calcium ions, and thus generally correspond to the lime-tailings mixtures (e.g., the first stream or solution 119 (FIGS. 1 and/or 2A) described herein. As shown in FIG. 9, the minerals include calcite (i.e., calcium carbonate), kaolinite, illite, quartz, and other amorphous phase materials (e.g., calcium aluminum hydrate and/or silicate hydrate). The percent distribution or relative concentration of each mineral vary based on the amount of lime added to the lime-treated tailings samples, which include a control group (i.e., 0 ppm lime dosage), a 1500 ppm lime dosage, and a 3,000 ppm dosage.

As shown in FIG. 9, the calcite concentration and lime dosage have a positive correlation with one another, as the control group includes about 1% calcite, the 1500 ppm dosage includes about 10% calcite, and the 3,000 ppm dosage includes about 21% dosage. As previously described, calcite is formed by reacting carbon dioxide with calcium ions present in the lime-treated tailings. Accordingly, the increase in calcite corresponds to the capture of carbon dioxide. That is, FIG. 9 demonstrates that the lime-tailings mixture previously described, e.g., with excess calcium ions and a pH of at least 11.0, promote the capture of carbon dioxide and formation of calcite. This is further demonstrated by (i) the positive correlation of the amorphous phase materials and lime dosage, (ii) the negative correlation of kaolinite and lime dosage, and (iii) the negative correlation of illite and lime dosage.

Figure 10:
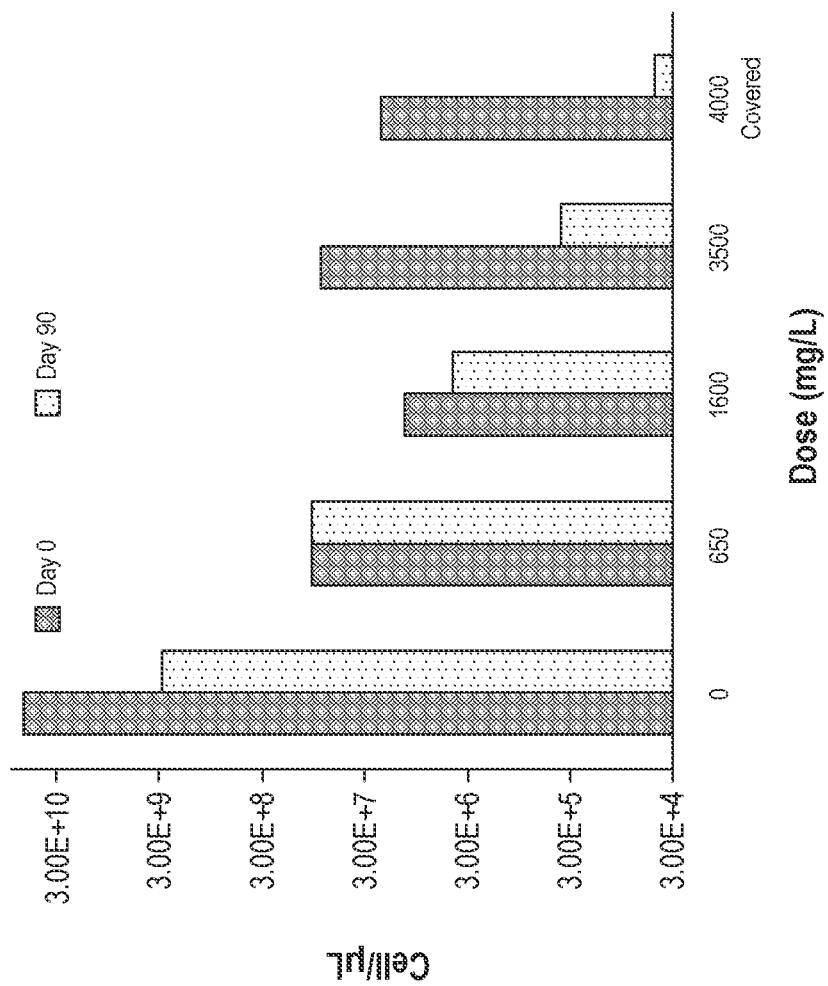
FIG. 10 is a chart illustrating varying amounts of microbial cells in different lime-treated samples, in accordance with embodiments of the present technology.

FIG. 10 is a chart illustrating varying amounts of microbes or microbial cells in different lime-treated samples, in accordance with embodiments of the present technology. The lime-treated tailings samples each have a pH of at least 11.0 and a solids concentration of at least about 55% by weight. The number of microbial cells (e.g., bacterial cells, archaea, or other microbiological organisms able to degrade organic material) per microliter (μL) of sample were measured initially (at 0 days) and again at 90 days for each of the different samples, which include a 0 mg/L lime dosage, a 650 mg/L lime dosage, a 1600 mg/L lime dosage, a 3500 mg/L lime dosage, and a 4,000 mg/L lime dosage. The 4,000 mg/L lime dosage sample was covered such that air was prevented from entering the container, and the other samples were open to the air.

As shown in FIG. 10, treating the tailings with any one of the lime dosages caused an initial drop of at least two orders of magnitude (100 times) in microbial cells. That is, relative to the sample with no lime dosage (i.e., 0 mg/L), the number of microbial cells of the 650 mg/L lime dosage and 3500 mg/L lime dosage dropped at least two orders of magnitude at day 0, and the number of microbial cells of the 1600 mg/L lime dosage and 4000 mg/L lime dosage dropped cells at least three orders of magnitude (1,000 times) at day 0. Additionally, the number of microbial cells for the 650 mg/L lime dosage remained about the same at 90 days, and the number of microbial cells for the 1600 mg/L, 3500 mg/L, and 4000 mg/L lime dosages decreased at 90 days. Specifically, the number of microbial cells for the 3500 mg/L at 90 days were more than two orders of magnitude less than the corresponding microbial cells at 0 days, and the number of microbial cells for the 4000 mg/L at 90 days were nearly three orders of magnitude less than the corresponding number of microbial cells at 0 days. Additionally, the number of microbial cells for the tailings sample with 4000 mg/L lime dosage measured at day 90 decreased at least six orders of magnitude (1,000,000 times) relative to the tailings sample with 0 mg/L lime dosage measured at 0 days.

As previously described, the microbial cells can produce methane biomass and/or other GHG (e.g., via anaerobic degradation of organic material of the tailings) that are released to the environment. By decreasing the amount of microbial cells, as shown in FIG. 10, the amount of methane and/or other GHG produced directly or indirectly via the microbial cells can be significantly reduced. Accordingly, an advantage of at least some embodiments of the present technology, in addition to those previously described, is the ability to reduce the release of methane and/or other GHG from lime-treated tailings having a pH of at least 11.0 or 12.0.

IV. Conclusion

It will be apparent to those having skill in the art that changes may be made to the details of the above-described embodiments without departing from the underlying principles of the present technology. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

We claim:

1. A method for treating sediments, the method comprising:
    adding a coagulant comprising lime to a first mixture comprising sediments and microbes to produce a second mixture comprising a pH of at least 11.0;
    after adding the coagulant, forming a buffer comprising soluble bicarbonates at a layer of the second mixture by reacting carbon dioxide with compounds including hydroxides provided via the lime; and
    maintaining the second mixture below the buffer above a pH of at least 8.5 to inhibit formation of carbon dioxide and/or methane via the microbes.

2. The method of claim 1, wherein:
    adding the coagulant causes the second mixture to include excess soluble calcium ions, and
    forming the buffer comprises reacting carbon dioxide from the atmosphere with the excess soluble calcium ions provided via the coagulant to form calcium carbonates and/or calcium bicarbonates.

3. The method of claim 2, wherein forming the buffer comprises reacting carbon dioxide, produced via aerobic degradation of organic material via the microbes, with the excess soluble calcium ions.

4. The method of claim 2, wherein the carbon dioxide from the atmosphere is absorbed into water of the first or second mixture as carbonic acid and the carbonic acid reacts with the excess soluble calcium ions to produce calcium carbonate and water.

5. The method of claim 1, wherein forming the buffer further comprises reacting carbon dioxide with excess soluble calcium ions that are contained in pore water of the second mixture.

6. The method of claim 1, further comprising removing water from the second mixture to produce a cake, the cake being in an aerobic state such that the microbes are inhibited from producing methane.

7. The method of claim 1, wherein:
    the second mixture comprises soluble alkaline sodium, and
    the method further comprises sequestering atmospheric carbon dioxide via reactions with the soluble alkaline sodium.

8. The method of claim 1, wherein the first mixture includes a first amount of microbes, and the second mixture includes a second amount of microbes less than the first amount.

9. The method of claim 1, wherein the layer of the second mixture where the buffer is formed is an upper surface of the second mixture and the buffer has a pH that is lower than the pH of the second mixture below the buffer.

10. The method of claim 9, wherein maintaining the second mixture below the buffer above the pH of at least 8.5 includes preventing, via the buffer, the pH of the second mixture below the buffer from decreasing below the at least pH 8.5 when absorbing atmospheric carbon dioxide over time.

11. A method for treating sediments, the method comprising:
    providing a sediments mixture comprising microbes, wherein the microbes are configured to produce undesirable gas emissions via degradation of organic material;
    adjusting pH of the sediments mixture to a first pH of at least 11.0, thereby inhibiting production of the undesirable gas emissions via degradation of the organic material; and
    after adjusting the pH, decreasing the pH of the sediments mixture to a second pH of 8.5-11.0 by forming a buffer comprising soluble sodium and/or calcium bicarbonates at a layer of the sediments mixture.

12. The method of claim 11, wherein:
    the sediments mixture comprises excess soluble calcium ions, and
    the method further comprises reacting the excess calcium ions with carbon dioxide produced via the degradation of the organic materials to form calcium carbonate and/or calcium bicarbonate.

13. The method of claim 12, wherein forming the buffer comprises reacting carbon dioxide produced via aerobic degradation of the organic material via the microbes with the excess soluble calcium ions.

14. The method of claim 12, wherein carbon dioxide from the atmosphere is absorbed into water as carbonic acid and the carbonic acid reacts with the excess soluble calcium ions to produce calcium carbonate and water.

15. The method of claim 12, wherein forming the buffer comprises reacting carbon dioxide with excess soluble calcium ions contained in pore water.

16. The method of claim 11, further comprising removing water to produce a cake, the cake being in an aerobic state such that the microbes are inhibited from producing methane.

17. A method for treating sediments, the method comprising:
providing a first mixture including sediments, fermentable organic materials, and microbes, wherein the microbes produce carbon dioxide and/or methane during degradation of the organic materials;
adding a coagulant comprising lime to the first mixture to produce a second mixture, wherein the second mixture comprises excess soluble calcium ions, and after adding the coagulant, inhibiting the production of carbon dioxide via aerobic degradation of the organic material by reacting carbon dioxide originating from the atmosphere with the excess calcium ions in water to form insoluble calcium carbonate and water.

18. The method of claim 17, wherein the first mixture has a pH of less than 10.0 and the second mixture has a pH of at least 11.0.

19. The method of claim 17, wherein inhibiting the production of carbon dioxide comprises maintaining a pH of the first mixture at or below 11.5 by formation of the insoluble calcium carbonate.

20. The method of claim 17, sequestering the insoluble calcium carbonate from the sediment mixture as a stable mineral.

* * * * *

UNITED STATES PATENT AND TRADEMARK OFFICE
CERTIFICATE OF CORRECTION

PATENT NO. : 12,209,041 B2
APPLICATION NO. : 17/861058
DATED : January 28, 2025
INVENTOR(S) : Nikolas Andrei Romaniuk et al.

It is certified that error appears in the above-identified patent and that said Letters Patent is hereby corrected as shown below:

In the Specification

Column 7, Detailed Description, Line 48, delete "methanogensis" and insert --methanogenesis-- therefor.

Column 9, Detailed Description, Line 25, delete "(CaO)" and insert --(CaO))-- therefor.

Column 9, Detailed Description, Line 26, delete "Ca (OH)$_2$)." and insert --Ca(OH)$_2$).-- therefor.

Column 11, Detailed Description, Line 2, delete "(Al$_2$(SO$_4$)$_3$))," and insert --(Al$_2$(SO$_4$)$_3$),-- therefor.

Column 15, Detailed Description, Line 39, delete "mixture 117" and insert --mixer 116-- therefor.

Column 15, Detailed Description, Line 41, delete "mixture 117" and insert --mixer 116-- therefor.

Column 15, Detailed Description, Line 54, delete "mixture 117" and insert --mixer 116-- therefor.

Column 16, Detailed Description, Lines 61-62, (Reaction 7), delete "Ca(OH)$_2$+H$_2$CO$_2$→CaCO$_3$·2H$_2$O" and insert --Ca(OH)$_2$+H$_2$CO$_2$→CaCO$_3$+2H$_2$O-- therefor.

Column 17, Detailed Description, Line 9, delete "114" and insert --104-- therefor.

Column 17, Detailed Description, Line 10, delete "mixture 117" and insert --mixer 116-- therefor.

Column 20, Detailed Description, Line 8, delete "anerobic" and insert --anaerobic-- therefor.

In the Claims

Column 27, Claim 17, Line 9, after "and", insert --¶--.

Signed and Sealed this
Twenty-fourth Day of June, 2025

Coke Morgan Stewart
*Acting Director of the United States Patent and Trademark Office*